Jan. 21, 1958 W. RAINEY 2,820,936

REMOTE CONTROL SERVOSYSTEM FOR TURRET PUNCH PRESS

Filed Dec. 11, 1951 13 Sheets-Sheet 1

INVENTOR
Walton Rainey

BY
ATTORNEYS.

Jan. 21, 1958 W. RAINEY 2,820,936

REMOTE CONTROL SERVOSYSTEM FOR TURRET PUNCH PRESS

Filed Dec. 11, 1951 13 Sheets-Sheet 2

INVENTOR
Walton Rainey

BY [signature]
ATTORNEYS

Jan. 21, 1958 W. RAINEY 2,820,936

REMOTE CONTROL SERVOSYSTEM FOR TURRET PUNCH PRESS

Filed Dec. 11, 1951 13 Sheets-Sheet 3

INVENTOR
Walton Rainey.
BY
ATTORNEYS.

INVENTOR
Walton Rainey
BY
ATTORNEYS.

REMOTE CONTROL SERVOSYSTEM FOR TURRET PUNCH PRESS

Filed Dec. 11, 1951 13 Sheets-Sheet 5

INVENTOR
Walton Rainey.
BY
[signature]
ATTORNEYS.

INVENTOR
Walton Rainey.
BY
ATTORNEYS.

Jan. 21, 1958 W. RAINEY 2,820,936

REMOTE CONTROL SERVOSYSTEM FOR TURRET PUNCH PRESS

Filed Dec. 11, 1951 13 Sheets-Sheet 7

INVENTOR
Walton Rainey.
BY
ATTORNEYS.

INVENTOR
Walton Rainey.
BY
ATTORNEYS.

Jan. 21, 1958 W. RAINEY 2,820,936

REMOTE CONTROL SERVOSYSTEM FOR TURRET PUNCH PRESS

Filed Dec. 11, 1951 13 Sheets-Sheet 9

INVENTOR
Walton Rainey.
BY
ATTORNEYS.

INVENTOR
Walton Rainey
BY
ATTORNEYS

REMOTE CONTROL SERVOSYSTEM FOR TURRET PUNCH PRESS

Filed Dec. 11, 1951

INVENTOR
Walton Rainey

BY

ATTORNEYS.

INVENTOR
Walton Rainey.
BY
ATTORNEYS.

Jan. 21, 1958 W. RAINEY 2,820,936

REMOTE CONTROL SERVOSYSTEM FOR TURRET PUNCH PRESS

Filed Dec. 11, 1951 13 Sheets-Sheet 13

INVENTOR
Walton Rainey.
BY
ATTORNEYS.

2,820,936

REMOTE CONTROL SERVOSYSTEM FOR TURRET PUNCH PRESS

Walton Rainey, Philadelphia, Pa., assignor to Wiedemann Machine Company, Philadelphia, Pa., a corporation of Pennsylvania Application December 11, 1951, Serial No. 261,078

22 Claims. (Cl. 318—30)

The present invention relates to turret punch presses of the type which may be used for punching holes, notches, slots and the like in metal and other sheets, plates, and the like.

A purpose of the invention is to accelerate the selection of tools by speeding up the procedure for selection and manipulation of the turrets to the new selected position. In accordance with the present invention, this speed is increased approximately 60 percent over the best prior art practice.

A further purpose is to permit the operator to select the next tool by a single manual operation, avoiding the necessity that the operator perform three or more separate operations as in prior practice.

A further purpose is to avoid the necessity of great skill by the operator in the control of the selector mechanism, and particularly in the observation of station members on the turrets as the latter rotate, it being difficult to read and respond to numbers moving at speeds of the order of 12 inches per second.

A further purpose is to make the turret control fully automatic after initial manual selection so that the operator can perform other duties, such as table positioning, during the time that automatic control takes place.

A further purpose is to reach the new turret position by the shortest possible route even though the operator does not select the shortest route in manipulating the selector.

A further purpose is to permit selection at any desired speed without imposing a limitation on the operator.

A further purpose is to obtain positive dead beat positioning, avoiding hunting, oscillating or overshooting the selected position.

A further purpose is to secure dead beat positioning without the necessity of expensive electronic, hydraulic, pneumatic or other similar controls, without expensive feed-back systems, and without using variable speed motors.

A further purpose is to drive the turrets by a standard reversing motor such as an open type induction motor starting by a standard reversing line starter.

A further purpose is to render the device foolproof in operation so that it cannot be damaged by an inexperienced operator.

A further purpose is to reduce the overall cost of the control system.

A further purpose is to permit the application of the device by conversion of existing turret drive systems on turret punch presses.

A further purpose is to improve the servicing and increase the interchangeability of the control system.

A further purpose is to permit emergency push button control in case of failure of the automatic system.

A further purpose is to generate an error signal by a self-synchronous system, to amplify the error signal, to apply phase discrimination to the error signal and then to energize the driving motor in the direction determined by the phase discrimination, and deenergize the driving motor when the amplified error signal is no longer strong enough to maintain energization.

A further purpose is to apply capacitor braking to the driving motor when the motor is deenergized.

A further purpose is to vary the sensitivity of the amplifier in response to a rectified pulse which is a function of driving motor speed, so that the motor will be deenergized closer to the null point when the turret is turning through a small angle than when the turret is turning through a larger angle. The control of the amplifier sensitivity has been found to be important chiefly when the angle of total movement is less than 10° to 15°, although in case of excessive friction or the like, it may be important in other cases.

A further purpose is to rectify an alternating voltage which is a function of motor speed in a rectifier network or bridge, to take off a corrective positive feed-back pulse from the rectifier network, and to apply the corrective feed-back pulse to a control vacuum tube to supplement fixed grid bias.

A further purpose is to discriminate the amplified error signal by discriminator vacuum tubes receiving an amplified signal on their control grids and having suitably equal comparison alternating voltages displaced 180° in phase applied in the external circuit from anode to cathode.

A further purpose is to operate the opposed coils of a differential relay by placing these coils in the anode to cathode circuits of the respective discriminator tubes.

A further purpose is to withdraw index pins to allow the turrets to turn, to drive the turrets toward a new position while the index pins are withdrawn, and to release the index pins and resiliently urge them against the surfaces of the turrets at a time when the turrets are slowing down prior to attainment of the selected position.

A further purpose is to select the new turret position by a selector arm which is held initially in the initial position by a release button, and which is permitted to turn for selection by displacing a selector plate, having openings corresponding to the punch position, from engagement with a selector key.

A further purpose is to initiate remote control actuation by a switch engaging the selector plate.

A further purpose is to lock the selector plate in non-selecting position by a cam suitably actuated by a rotary solenoid during the period of motion of the turret.

A further purpose is to predispose the electric circuit to actuate the driving motor in a predetermined direction in case the differential relay is not energized due to an absence of error signal in a 180° position, and to render the predetermined energizing of the driving motor inoperative where the differential relay is energized, as in a case in which the angle is more than zero degrees and less than 180°.

A further purpose is to adjust the null position of the self-synchronous generator and the control transformer with respect to one another by locking the related electrical elements, preferably the rotors of the self-synchronous generator and control transformer in corresponding positions, energizing the amplifier-discriminator while removing the excitation from the rotor of the self-synchronous generator, measuring the anode currents in the discriminator vacuum tubes, exciting the rotor of the self-synchronous generator, and adjusting the relative angular positions of the stators of the self-synchronous generator and control transformer until the anode currents in the discriminator vacuum tubes reach the values which they had when there was no excitation on the rotor of the self-synchronous generator.

Further purposes appear in the specification and in the claims.

In the drawings one only of the numerous embodiments in which the invention may appear has been illustrated, choosing the form shown from the standpoints of convenience in illustration, satisfactory operation and clear demonstration of the principles involved.

Figure 3:
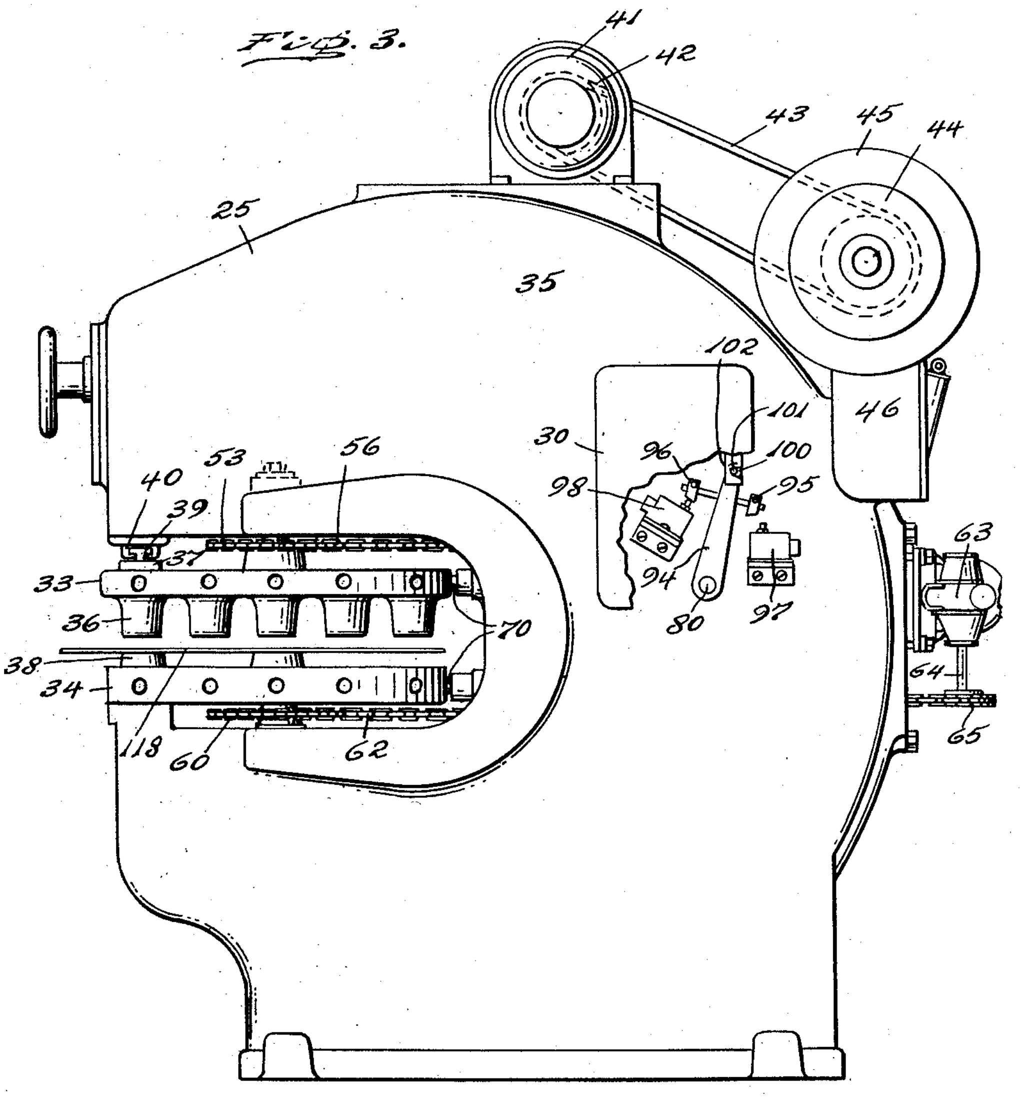
Figure 3 is a right-hand elevation of the punch press, with the safety switch housing broken away.
Figure 3A:
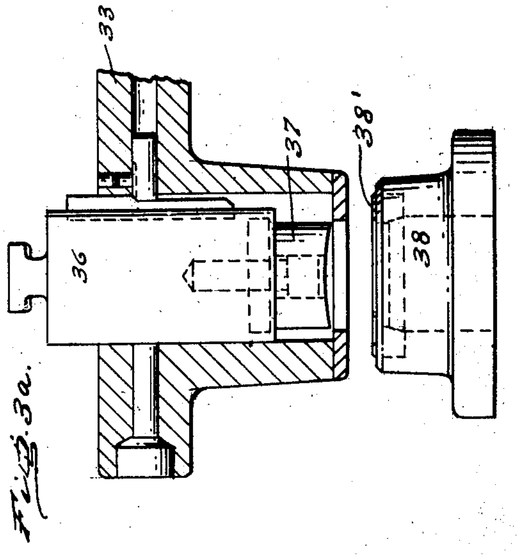

Figure 3*a* is an enlarged fragment of Figure 3 shown in axial section.

Figure 2:
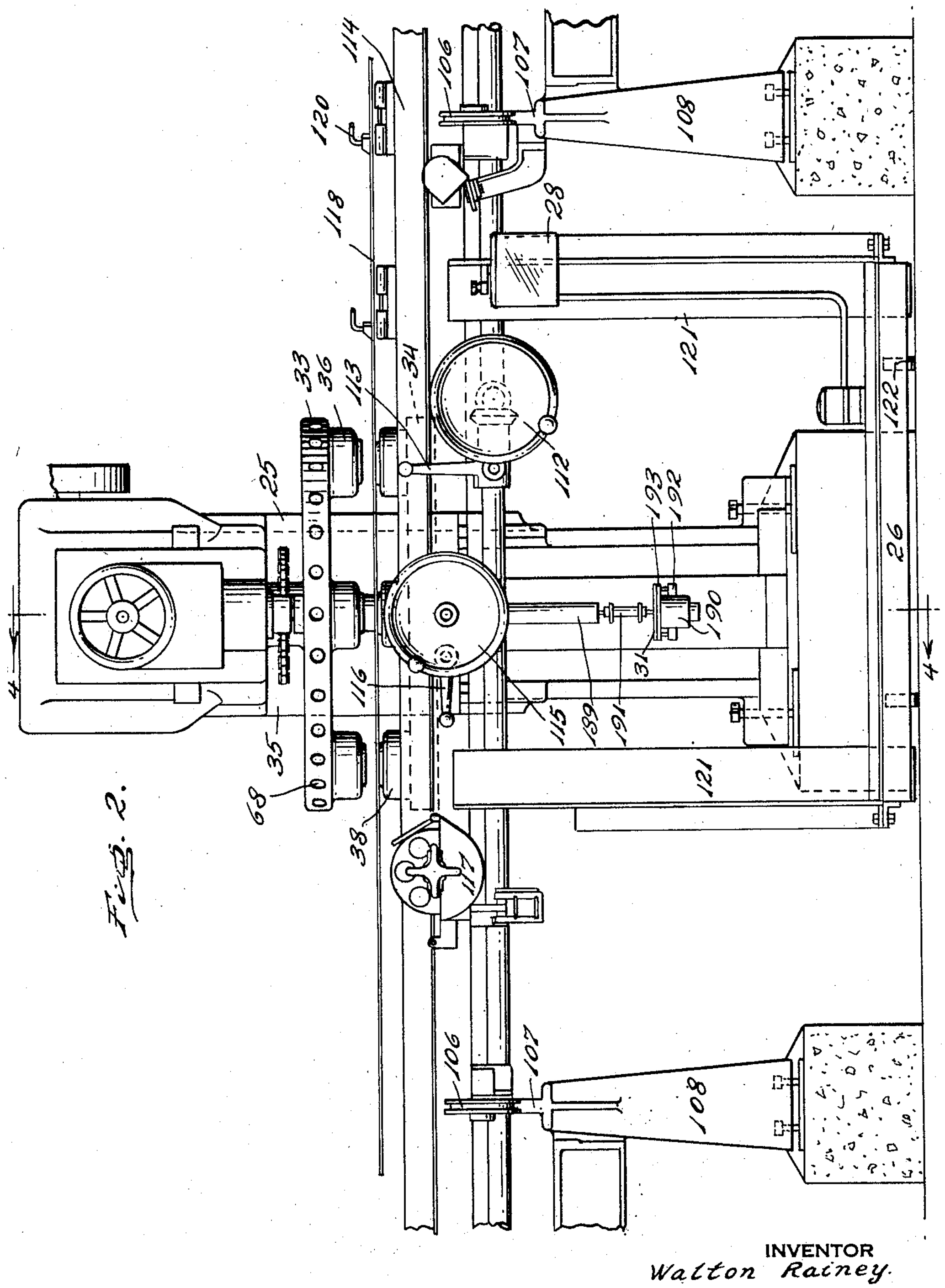
Figure 2 is an enlarged fragmentary front elevation of Figure 1.
Figure 4:
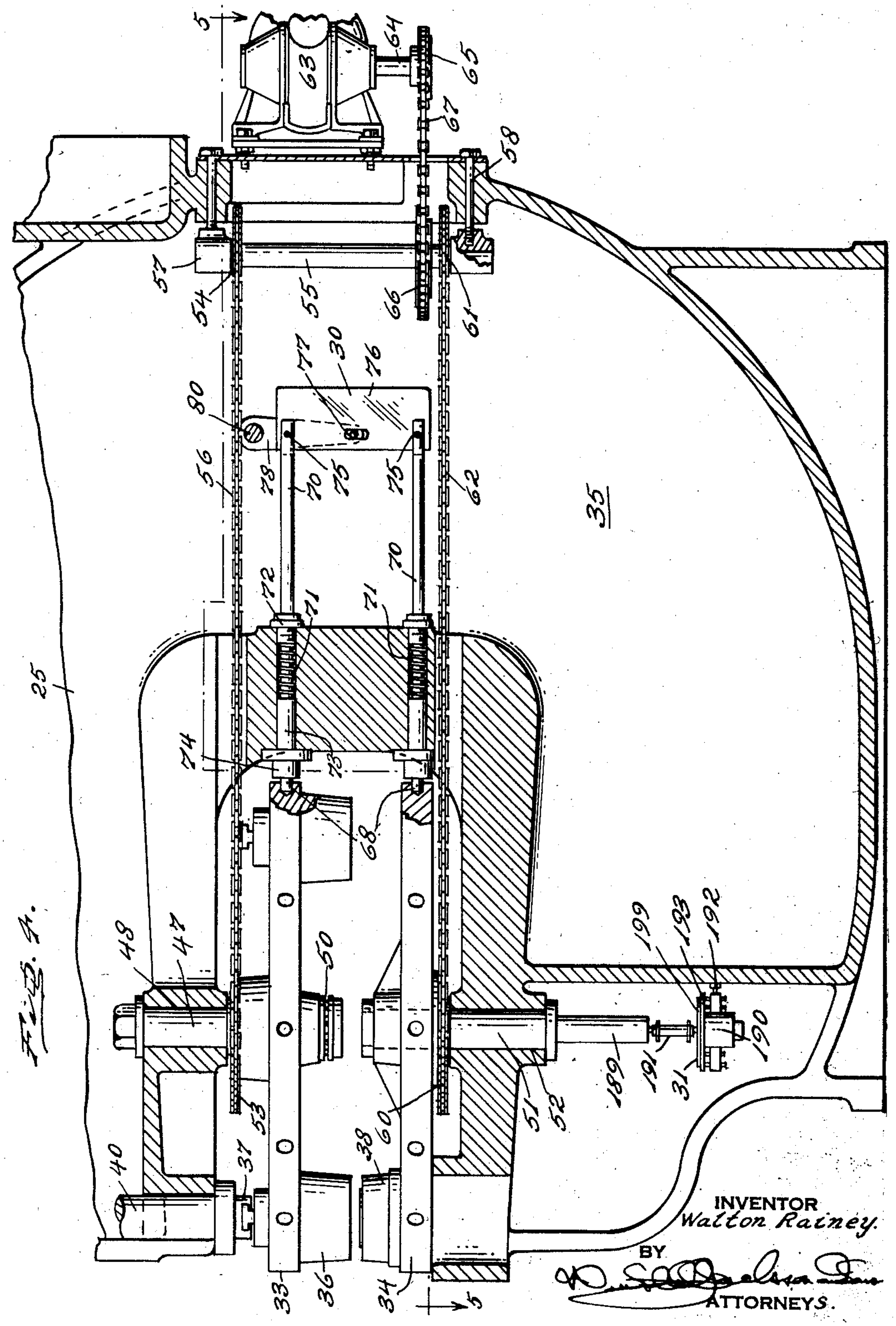

Figure 4 is an enlarged fragmentary section of the punch press of the invention on the line 4—4 of Figure 2.

Figure 5:
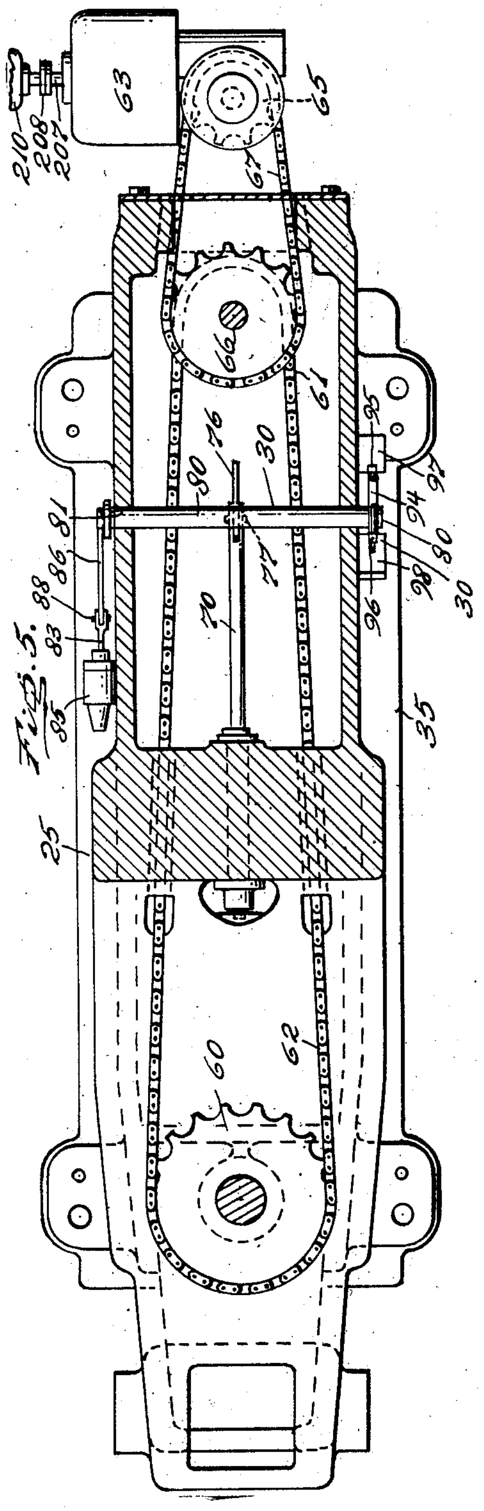

Figure 5 is a fragmentary section on the line 5—5 of Figure 4.

Figure 6:
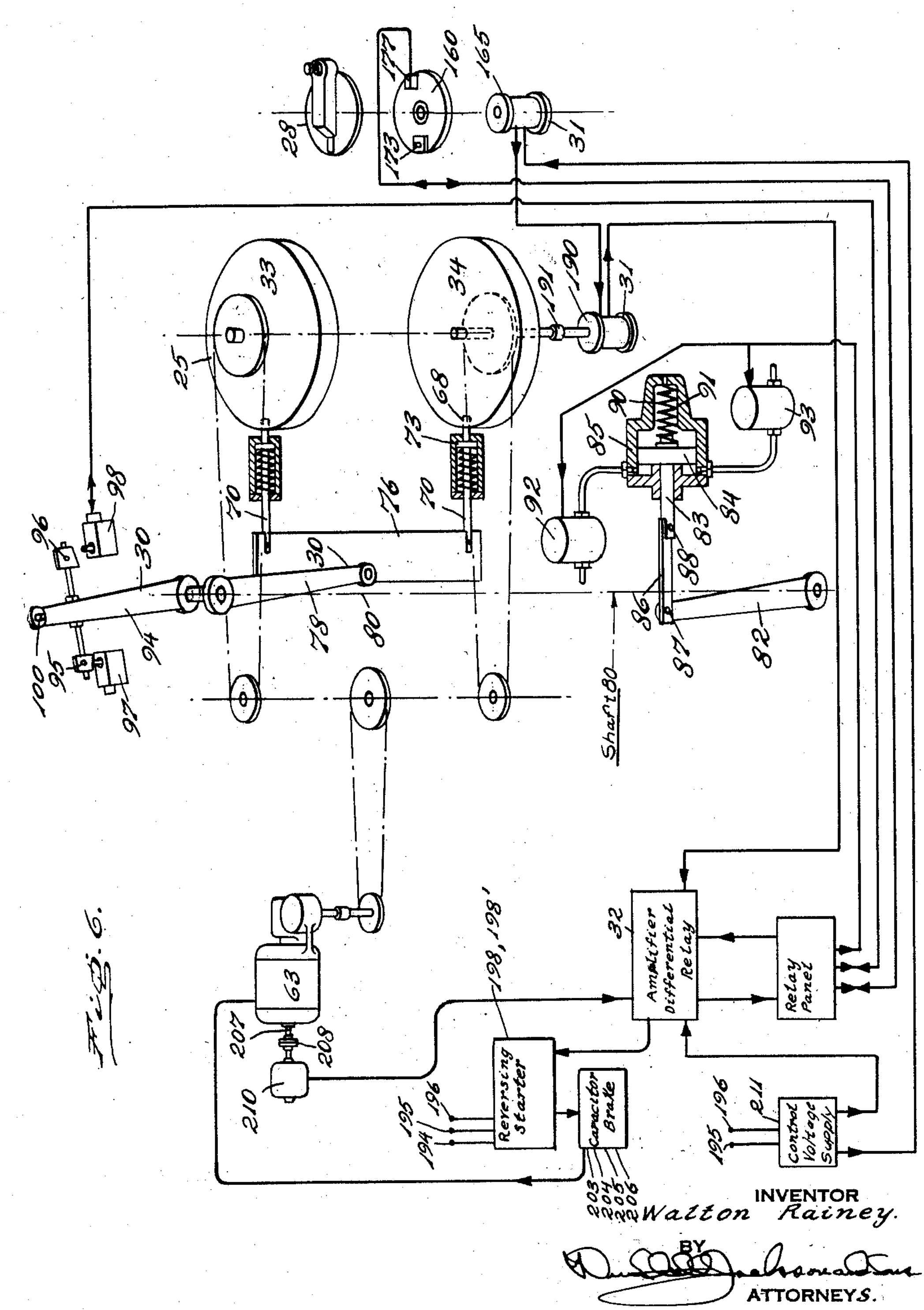

Figure 6 is a diagrammatic perspective showing the index pins, the turrets, and a general illustration of the remote control system.

Figure 7:
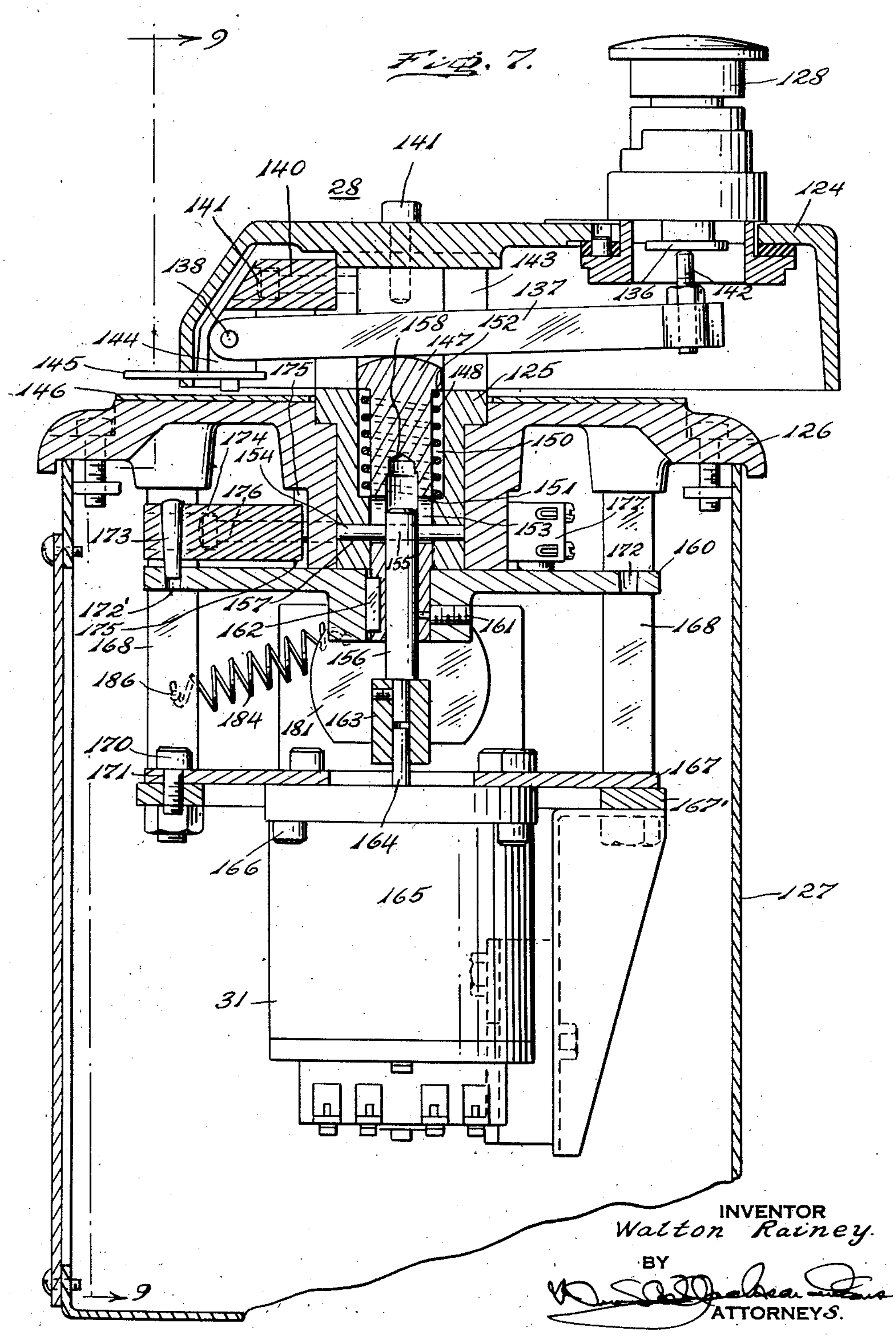

Figure 7 is an enlarged fragmentary central vertical section of the selector in non-selecting position.

Figure 8:
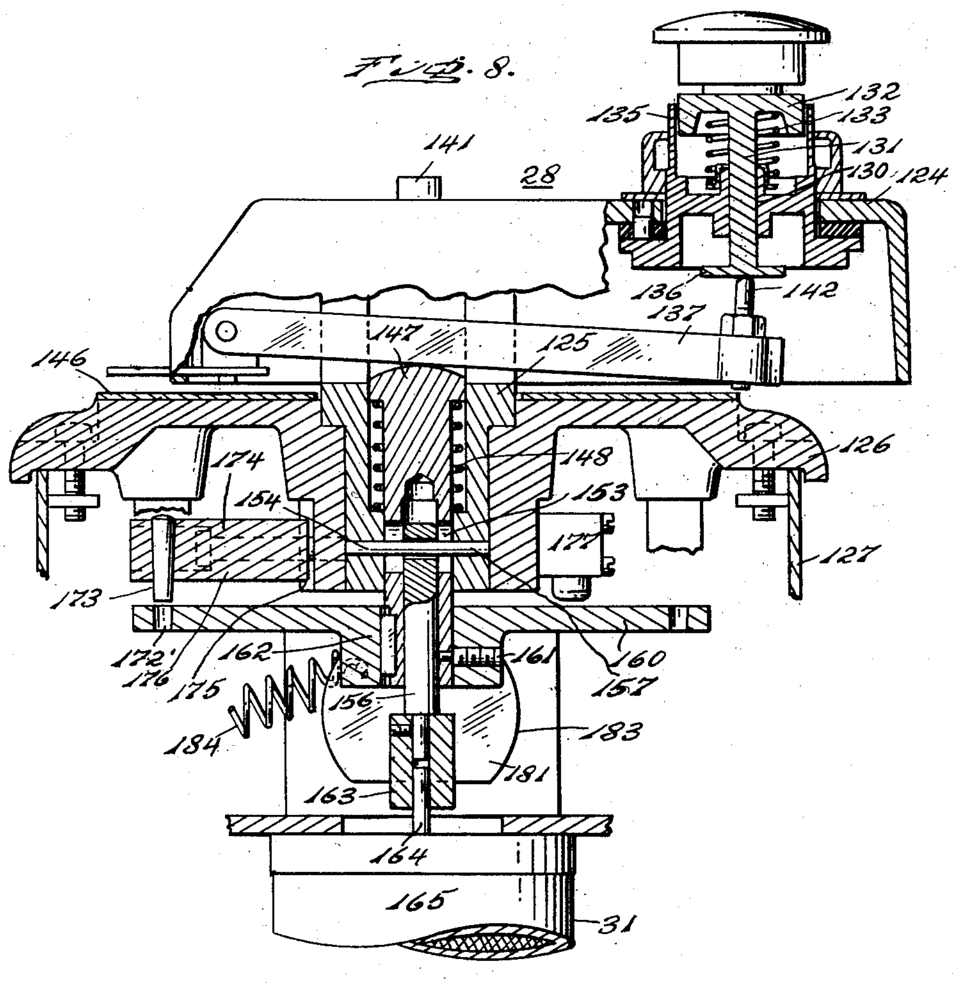

Figure 8 is a view corresponding to Figure 7 with the selector shown in selecting position, and the push button sectioned.

Figure 9:
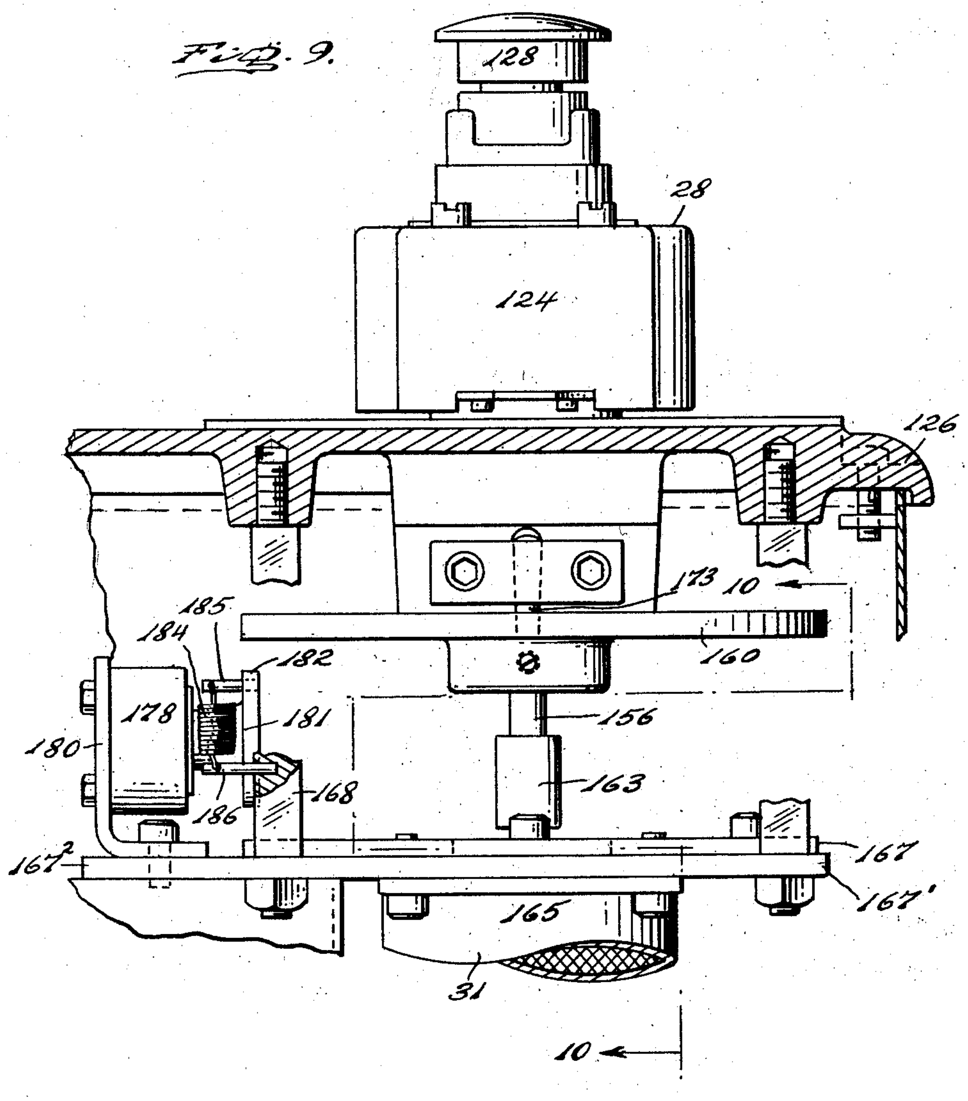

Figure 9 is a fragmentary section on the line 9—9 of Figure 7.

Figure 10:
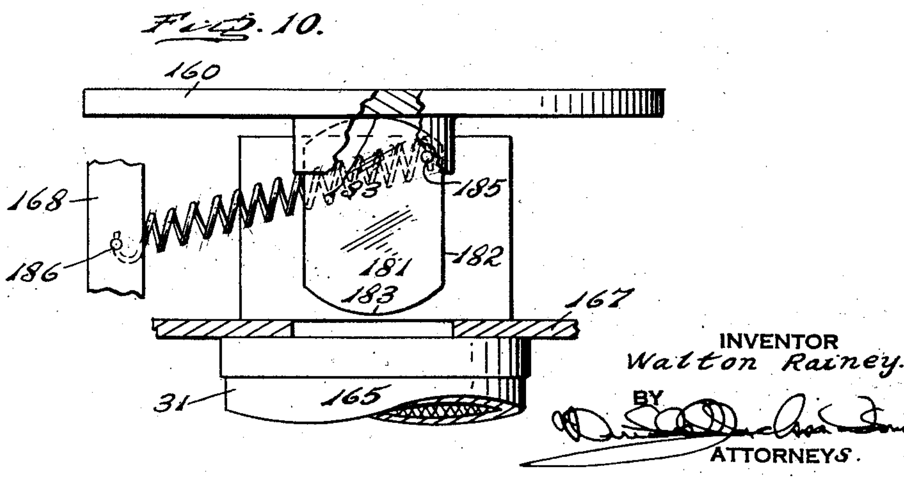

Figure 10 is a fragmentary view corresponding to the position of Figure 7 as far as the index plate is concerned, taken on the line 10—10 of Figure 9.

Figure 11:
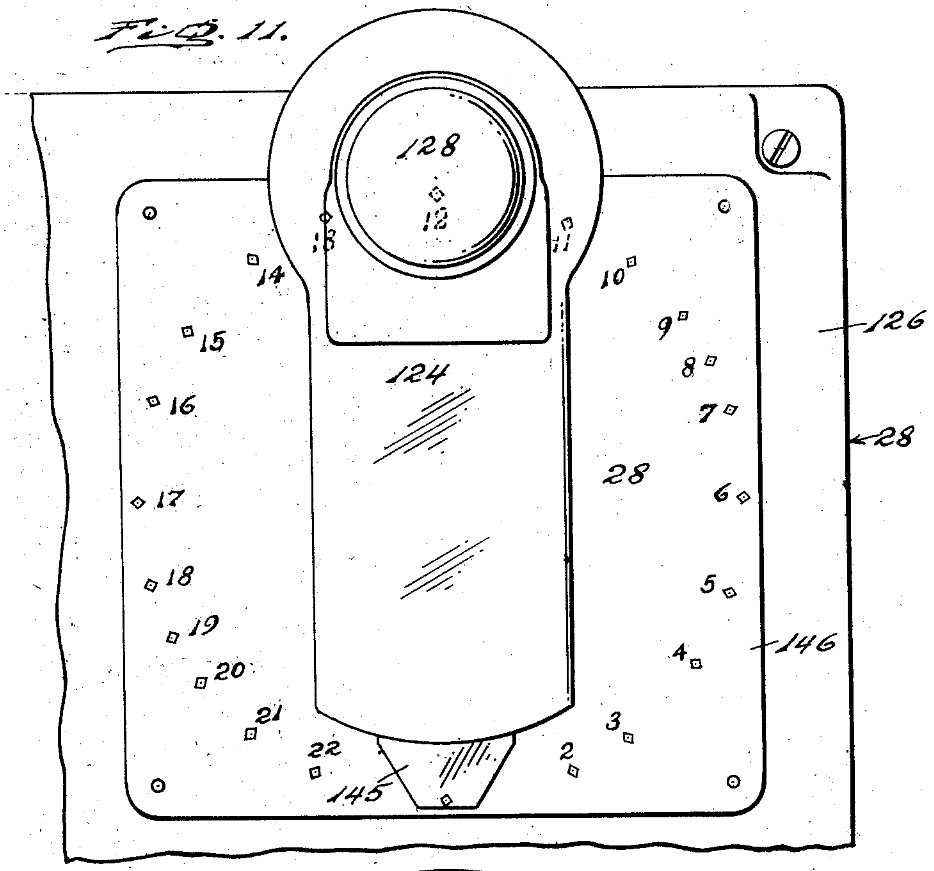

Figure 11 is a fragmentary top plan view of the selector.

Figure 12:
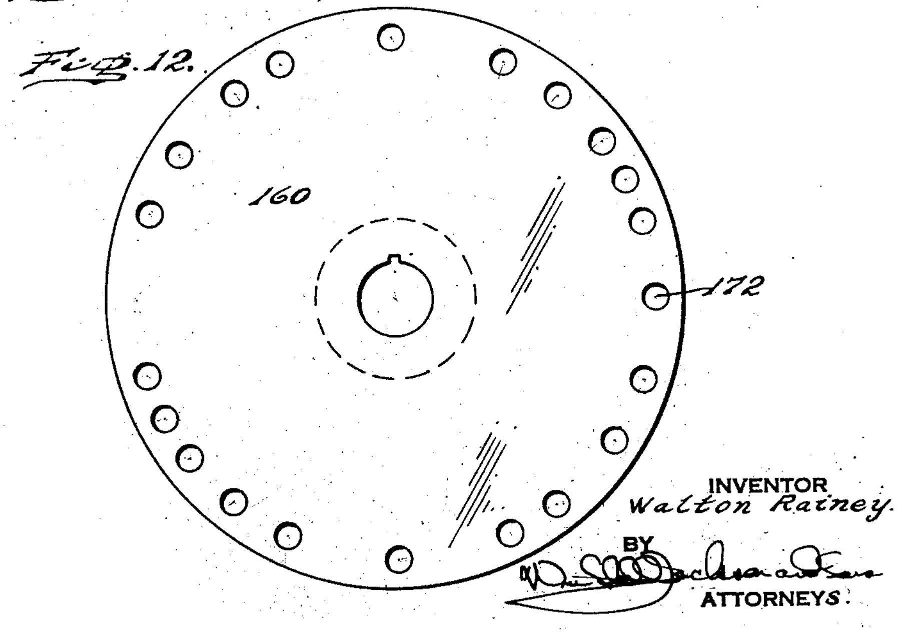

Figure 12 is a detail top plan view of the selector index plate.

Figure 13:
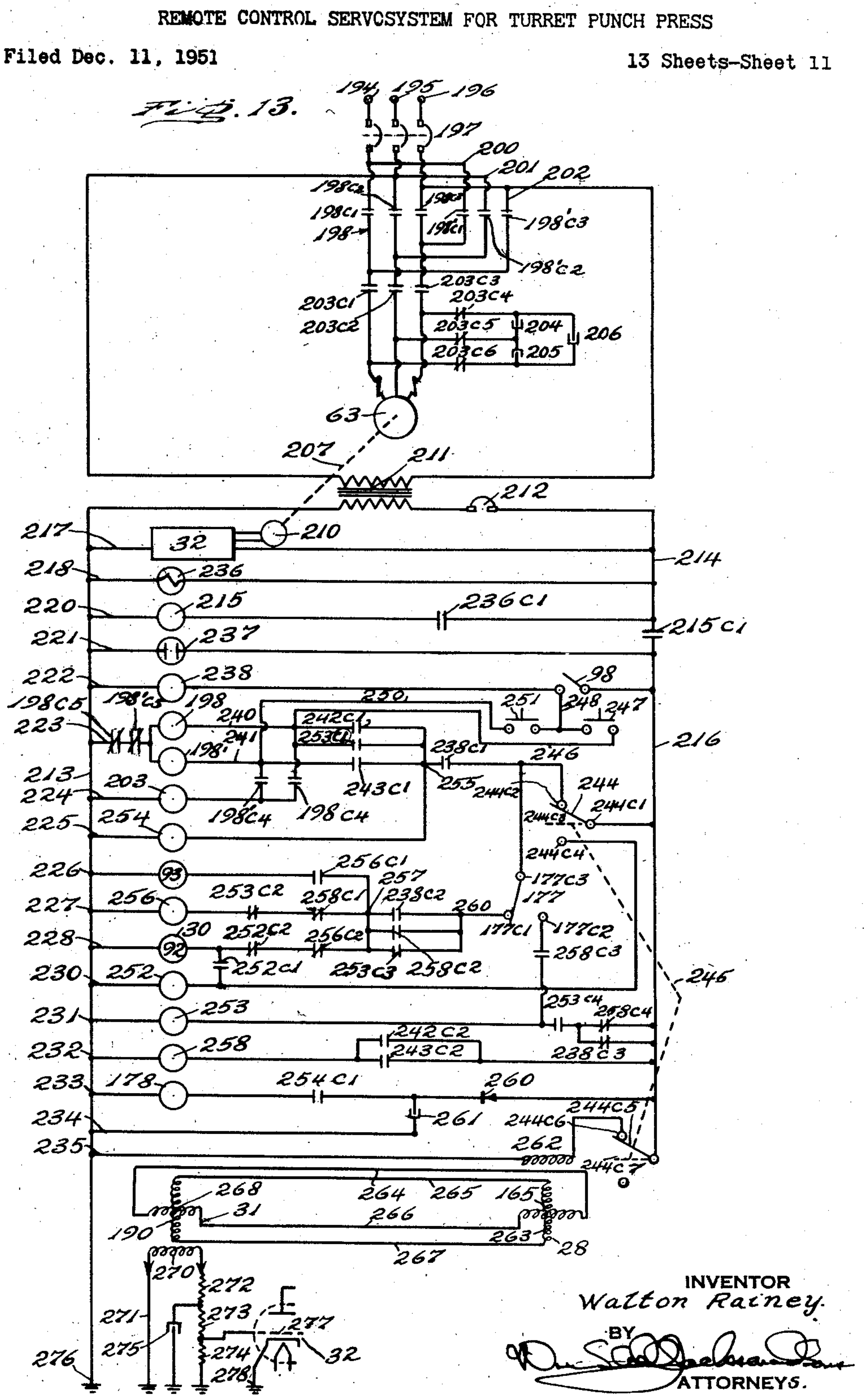

Figure 13 is a circuit diagram showing the driving motor and relay circuits, the self synchronous system and a fragment of the amplifier-discriminator.

Figure 14:
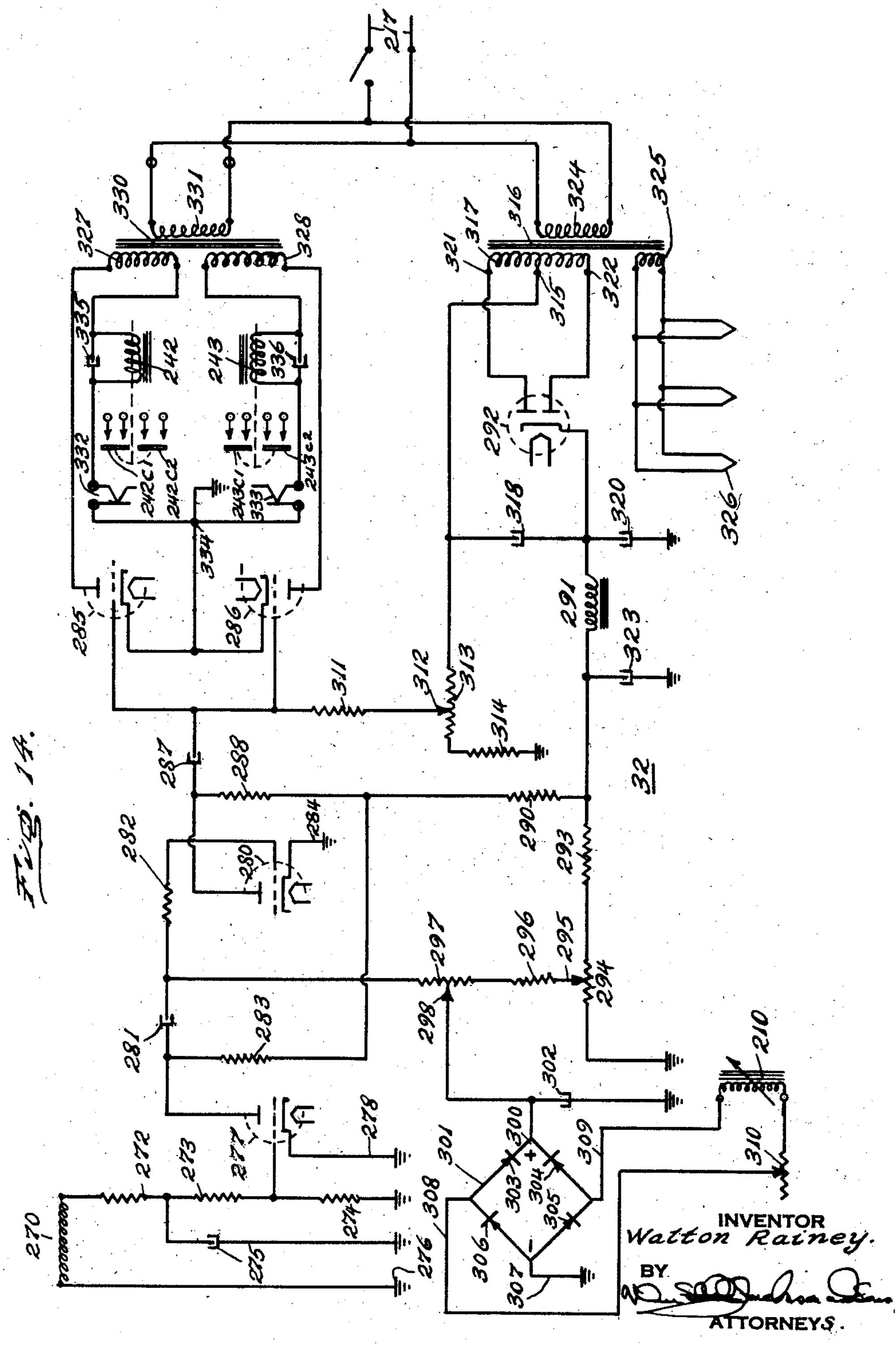

Figure 14 is a circuit diagram of the amplifier-discriminator.

Figure 15:
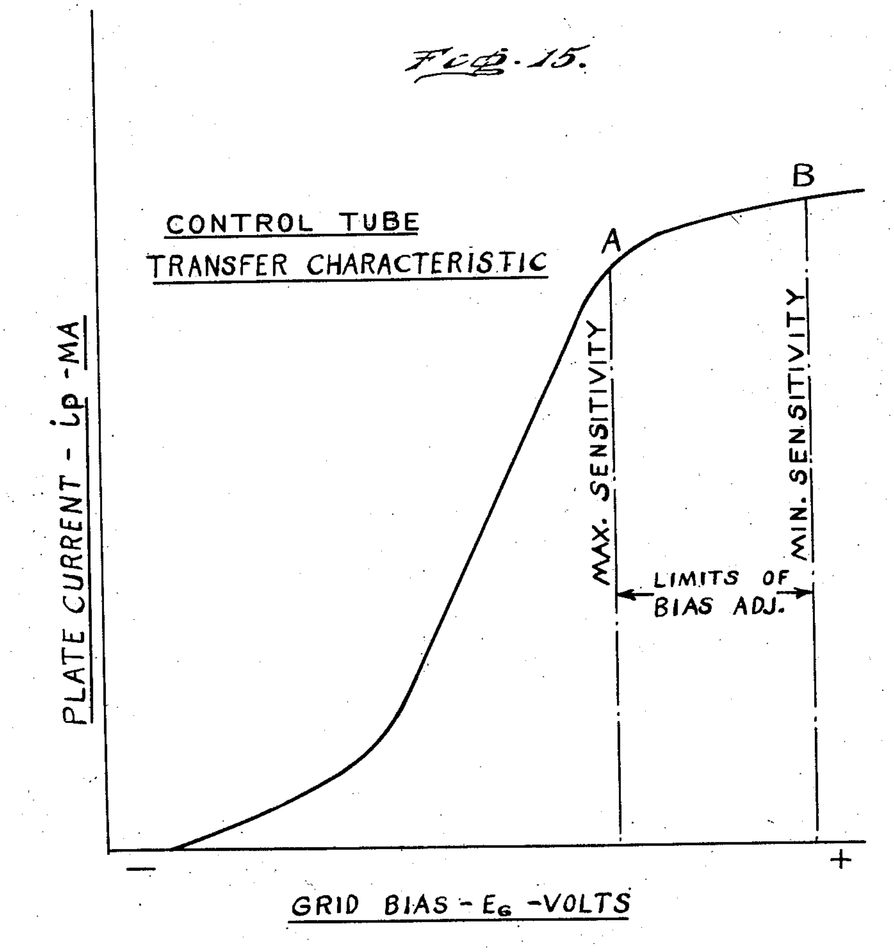

Figure 15 is a transfer characteristic curve for the control vacuum tube employed in the present invention.

Describing in illustration but not in limitation and referring to the drawings:

In turret punch press operation, it is highly important to be able to move quickly, simply and reliably from one turret position to another.

Prior art systems for accomplishing this have suffered from either very great complexity and expense, or limited utility, speed and effectiveness.

In accordance with the present invention, the speed of turret positioning is greatly increased, present indication being that speeds 60 percent faster than previous practice can readily be obtained even without specially skilled operators. Once the selection is made, the operation of the system is automatic and foolproof, so that inexperienced operators can be employed. The system will even correct for the mistake of an operator, since the turret is always positioned by the shortest route even though the selection has been made by a roundabout route.

Whereas in prior art practice as many as three manual operations were required in selecting, the present device permits selection by one simple operation.

Due to the servo operation of the device, the operator can perform other operations, such as table positioning, while the control system is completing the manipulation of the turret.

The system works equally well without regard to the speed with which the selector is manipulated and no limitation is imposed on selection speed.

The final position is achieved positively by indexing pins, and is accurate at all times. No hunting, oscillating or overshooting is possible. In accordance with the invention, the deceleration of the turrets is accomplished at a predetermined angle ahead of the null position, and this angle may, where desired, be reduced to allow for the fact that the turrets have not in a particular case come up to full speed, so that the turrets will reach the null position with slightly more kinetic energy than is necessary to achieve the null position but without excess kinetic energy which might cause a jolt when the indexing pins are positioned.

It will be evident also that the drop-out point of the index pins can be adjusted readily by adjusting the fixed bias on a control vacuum tube to correct for variation in the mass of the turrets due to differences in tooling.

The drive of the turrets is accomplished by standard single speed motors such as an open type induction motor, without need for multiple speed motors. A standard reversing line starter is used. This is a factor in the low cost of the system of the present invention.

The device of the invention can be effectively applied to existing turret punch presses as a conversion.

In case of failure of the automatic equipment, the device can be operated by push buttons.

In accordance with the invention, the selector is provided with a release button which must be depressed in order to turn the selector arm. The depression of the release button disengages from an index key an index plate having index openings corresponding to the punch positions, and shifts one of the switches essential for operation of the remote control system. It is then possible to turn the selector arm, which creates an angular error in the remote control system, but does not immediately initiate turret motion. When the selected position is reached and the index plate is returned with engagement of the index opening with the index key, actuation of the turret is initiated by the switch engaged by the index plate.

The index plate is held in the selected position until the turrets have completed their movement, a locking cam and rotary solenoid being desirably employed for this purpose.

During the period of manual selection, an error signal corresponding to the angular error between the self-synchronous elements at the selector and at the turrets is continuously generated, attenuated and corrected in phase, amplified and then applied to a control vacuum tube having an adjustable fixed grid bias. After manual selection has been completed and the control circuits have initiated turret movement by energizing the motor starter, the fixed grid bias of the control tube is desirably supplemented in the case of turret movement through a small angle or under unusual retardation or frictional forces, by a positive feed-back voltage proportional to the speed of the turrets. The output of the control vacuum tube is discriminated as to phase suitably by discriminator vacuum tubes which receive comparison alternating voltages 180° out of phase. The discriminator vacuum tube whose comparison voltage is most nearly in phase with the input response on its control grid undergoes an increase in its plate current. The plate currents of the discriminator vacuum tubes are suitably carried through opposed coils of a differential relay having opposed pick-up positions and a neutral intermediate position, and the relay picks up under these conditions in one direction closing contacts which energize a starter coil to actuate the turret motor in the proper direction.

As the action continues the turret moves closer and closer to the selected or null position and the error signal continuously reduces. At the same time due to tachometric feed-back, the sensitivity of the amplifier will decrease and both of these features combine to reduce the plate current of the discriminator tube which is holding the differential relay coil and cause the differential relay coil to drop out the relay when the turrets are at a predetermined angle with respect to the selected or null position. When the differential relay drops out the driving motor is deenergized. At the same time, desirably, braking is applied. This is most satisfactorily accomplished by connecting capacitor braking in circuit with the driving motor, since capacitor braking exerts a maximum effect when the speed is a maximum and reduces its counter torque as the speed drops off, thus allowing the turrets to coast at greatly reduced speed toward the null position. At the same time that the driving motor is de-energized and the braking is applied, the index pins are desirably brought into engagement with the circumferences of the turrets and resiliently urged against the turrets so that they will sink in the turret recesses as soon as the recesses line up at null position.

To protect against failure to operate when the problem involves movement through 180°, the circuit connects one of the starting coils of the turret motor in position to energize the motor in a predetermined direction at the beginning of the solution of each problem, and then in each case, where the differential relay picks up, the actuation of the starting coil in the predetermined manner is prevented by the actuation of the differential relay. In the case, however, of a 180° problem the differential relay does not immediately energize since the remote control system is at a false electrical null, and the turret motor is driven in the predetermined direction until the remote control system experiences an error voltage of sufficient magnitude to energize the differential relay and cause the system to operate in the normal manner.

*Description of structure*

The main assemblies of the device of the present invention are the punch press 25, the operator's platform 26, the compound gauging table 27, the selector 28, the index and safety switch assembly 30, the error sensing assembly 31, and the amplifier-discriminator 32.

The punch press employed may be of any suitable turret type, provided, as is common in such devices, with a punch turret 33 and cooperating die turret 34, rotatably mounted in a C frame 35.

The punch turret 33 has removable punch holders 36 having punches 37 suitably individual in character and differing among the different punches in diameter, contour, or both. The dies 38' are supported in die holders 38 which hold dies corresponding in size of opening and contour with the corresponding punches. It will thus be evident that the operator is offered a selection of sizes and types of punches and cooperating dies, any one of which may be selectively brought into punching position in engagement with the locking key-way 39 of ram 40 which is moved in the punching and retraction stroke by any suitable crank mechanism, not shown, through the drive from motor 41, pulley 42, belt 43, pulley 44 and fly wheel 45 which interconnects through a gear reduction, not shown, with the crank mechanism driving the pitman and ram (not shown) as well known in the art.

The fly wheel 45 is suitably journalled on gear box 46 forming part of the C frame 35.

The punch turret is journalled on stub shaft 47 (Figure 4) which is stationary and secured in opening 48 in vertical position on the C frame. An antifriction journal and thrust bearing 50 for the punch turret is provided at the lower end of the stub shaft. The die turret is mounted on stub shaft 51, which turns with the turret, journalling in bearing 52, formed from the C frame coaxially with the stub shaft 47. Sprocket 53 is keyed to punch turret 33, and is connected in driving relation to sprocket 54 on adjustment sprocket shaft 55 by chain 56. The adjustment sprocket shaft 55 is vertical, and supported at its two ends in socket bearings 57 which are adjustable for the purposes of tensioning the upper chain and the cooperating lower chain by tension bolts 58 extending through the back of the C frame into the socket bearings.

The die turret 34 has keyed thereto sprocket 60, which is interconnected to sprocket 61 on shaft 55 by chain 62.

The turret prime mover is motor 63, which may be of any suitable type but preferably is a polyphase induction motor with high torque windings. The motor is desirably of the gear-in-head type to provide suitable speed reduction so that the turrets can be turned at a speed of the order of six to seven R. P. M. The speed reduction shaft 64 of the motor carries sprocket 65 interconnected to sprocket 66 on shaft 55 by chain 67.

Thus it will be evident that prime mover 63 when in operation will turn the turrets as long as they are free to turn.

Each tool position on the turrets is provided with a radially extending indexing pin opening 68, best seen in Figure 4, to receive the end of an indexing pin 70, suitably having a radius on the forward end to permit guiding the pin into the indexing opening. The opening 68 is preferably provided with a hardened steel bushing. Each indexing opening is aligned in a radius of the turret which extends through the vertical punching axis at that turret position, so that when the indexing pins are in place for any turret position, the punch will be correctly aligned with the ram, and the die will be correctly placed in reference to the punch.

The indexing pins are spring urged toward indexing position, suitably by springs 71, which act between bushings or glands 72 through which the indexing pins slide and which are secured in one end of the spring opening in the frame, and enlarged head portions 73 at the ends of the pins toward the turret. Beyond the heads 73 the indexing pins are reduced and passed through guiding bushings 74 secured to the ends of the spring openings adjoining the turrets. The indexing pins at the ends remote from the turrets are pivotally secured at 75 to an equalizing plate 76 which has a lost motion pin and slot connection 77 with crank arm 78 on index pin shaft 80 journalled at 81 at spaced points in the frame.

The left hand end of the shaft 80 outside the frame carries crank arm 82 (Figure 6) which is operatively connected to the piston rod 83 of piston 84 in air cylinder 85 by link 86 pivoted at 87 to the crank and pivoted at 88 to the piston rod. The piston is urged into indexing position by spiral compression spring 90 in a spring well 91 extending coaxially from the air cylinder. The air cylinder is operated to throw the piston to the right in Figure 6 by electrical energization of normally-closed solenoid-actuated valve 92 (Figures 6 and 13). The air cylinder is actuated for exhaust by normally-closed solenoid-operated valve 93 (Figures 6 and 13). It will be understood that the use of separate forward-acting and exhaust valves is preferable though not essential, as it provides larger openings and thus permits more rapid action.

At the right hand end of index shaft 80 (Figures 3, 5, 6 and 13), the index shaft carries crank 94 which at opposite ends mounts adjustable trip dogs 95 and 96. Dog 95 cooperates with normally open snap switch 97 mounted on the outside of the frame and dog 96 cooperates with normally open snap switch 98 similarly mounted. Switch 97 is employed as a safety switch to prevent inadvertent tripping of the press, and is suitably connected in any way desired in the press tripping circuit.

At the outer end of crank 94, pin 100 engages recess 101 of press interlock 102 (Figure 3) to prevent mechanical tripping of the press (as well known in the art) in case the electrical interlocks fail when the index pins are withdrawn from the turrets.

The compound gauging table has two separate right hand and left hand supporting beds 103 and 104 at the same level as the mouths of the dies. The beds 103 and 104 are secured to beam 105, and the combination of beam and beds is movable toward and away from the press on rollers 106 which ride rails 107, on piers 108. Racks 110 beside the extreme left hand and right hand rails are engaged by gears 111 which are manipulated to move the table back and forth by hand wheel 112. Lock 113 clamps the table in any position relatively toward and away from the press.

The top of beam 105 forms a transverse rail on which work carriage 114 moves back and forth under the action of hand wheel 115, and a suitable rack and pinion drive (not shown) and is locked in any desired position by clamp 116.

The required position for any punch impression is conveniently indicated along with the tool requirement, by a drum type solenoid operated chart holder 117 as well known in the art.

Work 118 is secured to the carriage by work clamps 120.

Operator's platform 26 in front of the table is secured to the beam 105 by uprights 121 at the two ends, and the platform is supported on rollers 122, so that the platform follows the table in movement toward and away from the punch press, and the operator is always conveniently located to hand wheels 112 and 115 to manipulate the work into and out of and also laterally of the punch press.

It will be evident, of course, that suitable dials and scales are provided on hand wheels, beams and rails so that the operator can accurately set the work with respect to the punching position.

On the platform suitably at a convenient position on the right hand upright, the selector unit 28 is mounted, shown more in detail in Figures 7 to 12 inclusive.

Other press controls including press trip switch 123 are provided in association with the seletcor, and at any convenient position near it.

The selector comprises a selector arm 124 pivotally mounted on pivoting element 125 on cover 126 of casing 127.

Selector arm 124 is held in a circumferential position by push button 128.

The push button is of conventional moisture and oil proof type design, as shown in Figure 8, having a guide portion 130 which guides a stem 131 carrying a head 132 which is spring urged outward by spiral compression spring 133. An enlarged pusher element 136 at the lower end of stem 131 limits the retraction. A sleeve 135 telescopes with head 132 to make a seal.

At the bottom of the push button, pusher element 136 is maintained in continuous engagement with an operating lever 137, mounted on a fixed pivot 138 on a bracket 140 which is bolted at 141 to pivoting element 125 on which the selector arm turns. The selector arm is itself bolted at 141 to the top of the pivoting element 125. The lever 137 has an adjustable contacting abutment 142 consisting of a screw (with lock nut) which engages the pusher element 136 and is capable of taking up any lost motion in the mechanism.

It will be seen that pivoting element 125 is recessed at 143 in line with a recess 144 in bracket 140 so as to permit movement of lever 137 in response to the action of the push button.

At the lower end of bracket 140 a suitably transparent index pointer 145 is mounted extending along the medial axis of lever 137, and cooperating with angular positioning indications on a dial 146 mounted on the top of cover 126. It will be understood that the angular position indications will desirably be numbered as shown in Figure 11 to indicate the sequence from an arbitrary starting point.

The operating lever 137, intermediate between its pivot point and the opposite end, engages a plunger 147, which is urged into retracting position by a spiral compression spring 148 which is acting in a spring recess 150 in pivoting element 125 between a shoulder 151 at the bottom of the spring recess and a shoulder 152 on the plunger 147. Plunger 147 has, suitably at diametrical opposite positions, longitudinal slots 153 which receive pin 154 extending through transverse opening 155 in a central shaft 156 and engaging at the extremities in openings 157 of the pivotal member 125. The shaft 156 extends through an opening at the center of the plunger and the plunger extends through an opening in the center of the pivotal element 125. In retracted position of the push button and operating lever, there is freedom for axial motion by the plunger 147 toward shaft 156 due to the fact that a shouldered recess 158 in the plunger has lost motion between the upper portion of the recess and the upper end of shaft 156 so as to permit movement of the plunger toward and suitably into engagement with the upper end of the shaft as best seen in Figure 8 when the push button and operating lever are depressed.

At the lower end of plunger 147, index plate 160 is suitably secured to the lower end of the plunger, as by set screw 161 engaging in a recess in the plunger. The index plate is keyed to the plunger at 162.

Shaft 156 extends below the index plate, and is connected as by a coupling 163 to the shaft 164 of a command self synchronous generator 165 which is bolted as at 166 to mounting plate 167 which is adjustably secured to support plate 167′ by bolts 170. The mounting plate is suitably slotted at 171 in line with the bolts 170 to permit sufficient angular adjustment of the command self synchronous generator 165 to adjust the electrical zero or null point of the system. The support plate 167′ is suitably secured by studs 168 extending down from cover 126.

Index plate 160 at circumferential outer positions is provided with suitable tapered openings 172 which are arranged in the angular relationship of the individual turret positions so that each one of the openings 172 corresponds to one of the turret positions in angular relationship to all other openings and corresponding turret positions.

As already explained, it is desirable that the respective opening positions 172 and turret positions be arranged in diametrically opposite pairs, so that for each position on the selector button side of the axis there is a corresponding opening 172′ 180° removed, which can be used for indexing purposes. An indexing key 173, suitably tapering to conform with the taper of the openings 172, is mounted as by bracket 174 above the index plate, keyed at 175 and bolted at 176 to the cover plate.

Thus it will be seen that when the push button and operating lever are depressed and the plunger is depressed, the plunger 147 has longitudinal freedom with respect to pin 154, but as it moves down it disengages index plate 160 from key 173 and leaves the plunger free to rotate. As the selector arm turns, it turns pivotal element 125 turning pin 154, command self synchronous unit shaft 155 is turned by the pin in unison with the selector arm, so that the command self synchronous generator 165 always assumes the selector arm position and is in position electrically to connect with the self synchronous control transformer or receiving unit, and produce an error signal when angular displacement exists between the two units.

As the index plate is depressed, snap acting single pole double throw switch 177 (Figures 7, 8 and 13) having contacts 177C1, 177C2 and 177C3 (Figure 13) shifts from its position connecting 177C3, to 177C1 to the position connecting 177C3 to 177C2. When the index plate retracts, the reverse action of the switch takes place as later explained.

Rotary solenoid (stalled motor) 178 is positioned by bracket 180 on extension $167^2$ of support plate 167′ secured to studs 168 (Figure 9). The rotary solenoid mounts at its inner end a locking cam 181 having a flat 182 which permits release of the index plate for selection, and having opposite suitably arcuate surfaces 183 desirably at 90° to the release position which respectively engage the index plate 160 and the mounting plate 167 (Figure 10). The locking position of the locking cam is well shown in Figure 10 and the cam is shown in non-locking position in Figures 7, 8 and 9.

The locking cam is spring urged toward non-locking position by spiral tension spring 184 having anchor 185 on the locking cam and stationary anchor 186 on one of the studs 168. The rotary solenoid is self-limiting in angular motion in both directions as well known.

Figure 1:
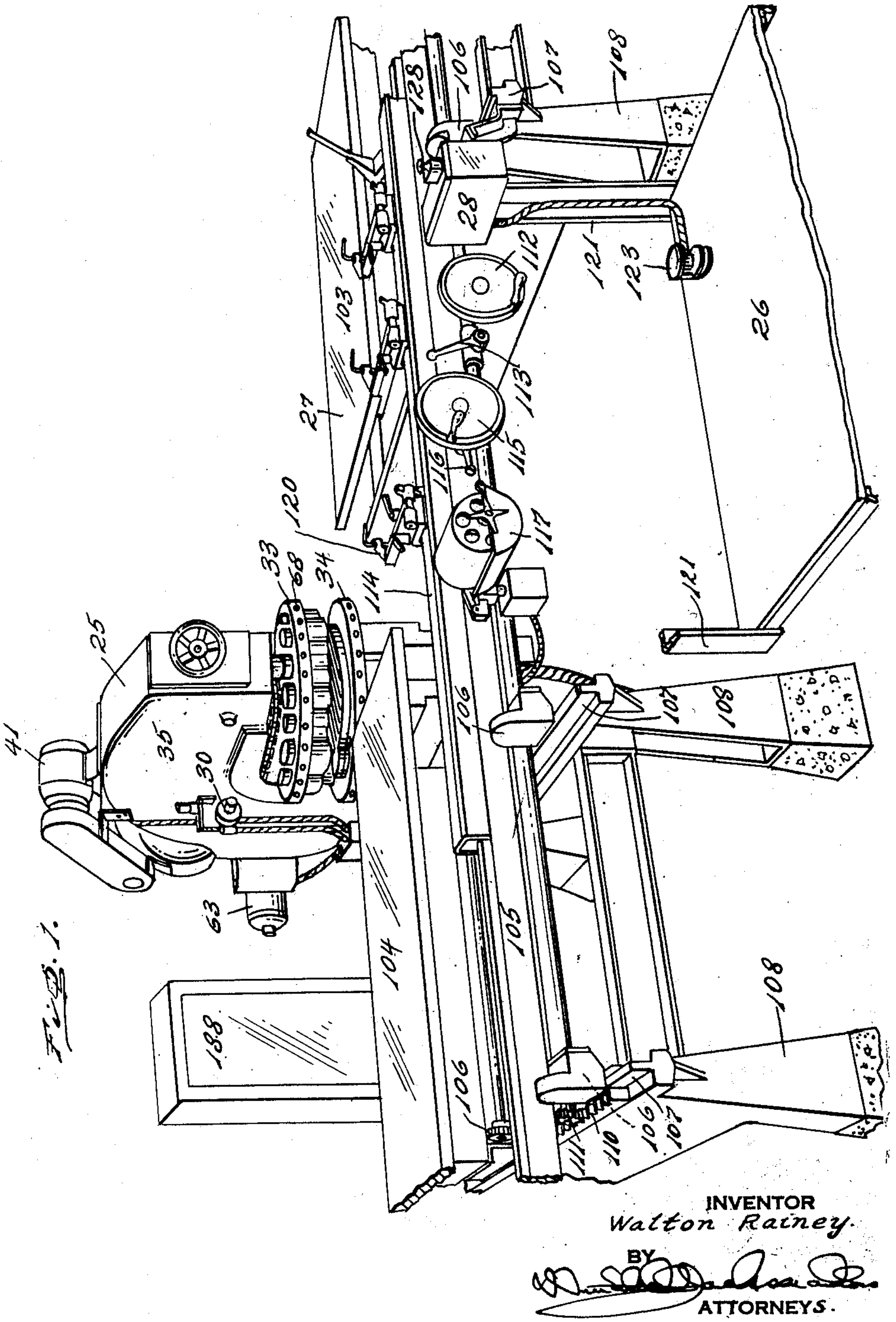
Figure 1 is a fragmentary perspective of a turret punch press control system and compound gaging table embodying the principles of the present invention.

The circuit including the self synchronous receiver or control transformer will be best understood by reference to Figure 13, and the mounting of the control transformer is best seen in Figure 4. The bulk of the equipment of Figures 13 and 14 will unless otherwise indicated be placed in cabinet 188 (Figure 1).

At the lower end of shaft 51 (Figure 4), an extension 189 is interconnected with a self synchronous receiver or control transformer 190 by a flexible coupling 191. The mounting is by bracket 192 on the frame and support plate 193 from the bracket mounting plate 199, to which control transformer 190 is secured, permits angular adjustment of the stator to align the electrical zero or null point of the self synchronous system. This arrangement is similar to the mounting and adjustment of self synchronous generator 165 (Figure 7).

Considering now the circuit of Figure 13, power leads 194, 195 and 196, suitably three phase commercial frequency (60 cycle) alternating current, are carried through a disconnecting means 197, conventionally a circuit breaker, and then through a commercial reversing starting switch 198 having contacts 198C1, 198C2, 198C3, 198C4 and 198C5 for forward starting and having contacts 198'C1, 198'C2, 198'C3, 198'C4 and 198'C5 for reverse starting. The reverse starting contacts are in respective reversing circuit branches 200, 201 and 202 as well known. The forward starting coil is designated 198 and the reverse starting coil is designated 198'.

In series with the line are placed normally-open contacts 203C1, 203C2 and 203C3 of brake-applying relay 203. In separate circuit branches connected respectively to each of the lines beyond the contacts 203C1, 203C2 and 203C3 are placed normally-closed contacts 203C4, 203C5 and 203C6 respectively of the same relay. Each phase beyond the contacts 203C4 and 203C5 and 203C6 is shunted by one of the braking capacitors 204, 205 and 206, the connection being in delta with each capacitor across one phase.

The lines beyond the contacts just described are connected to three phase induction motor 63, which drives the turrets through the mechanism already described, and also is mechanically interconnected by shaft 207 and coupling 208 to tachometer generator 210 which is interconnected to the amplifier-discriminator 32 as more fully explained in reference to Figure 14. The tachometer generator 210 is of permanent magnet excitation, and has linear alternating current characteristics with respect to speed so that the output will be directly proportional to the speed of rotation.

Across one of the phases of the line, the primary of transformer 211 is connected, providing a convenient step-down to the desired voltage on the controls, suitably 110 volts. The secondary of transformer 211 is connected through circuit breaker 212 to leads 213 and 214 for the controls. Lead 214 is connected by normally-open contact 215C1 of interlocking relay 215 to lead 216, thus assuring delay in energizing the control circuit until after a predetermined time delay interval to allow the amplifier to warm up.

Several main circuit branches are connected between lead 213 and leads 214 and 216 respectively. In sequence from the top of Figure 13 these circuit branches are designated 217 to 235.

Circuit branch 217 provides the power supply for the amplifier-discriminator 32 of Figure 14.

Circuit branch 218 contains thermal time delay relay 236 which has normally-open contact 236C1 in series with interlock relay 215 in circuit branch 220, and provides adequate time delay to permit the vacuum tubes to heat up before actuation of the device. Circuit branch 221 contains gas filled indicator tube 237 which shows on the panel when the device is ready for operation.

In circuit branch 222, relay 238 is provided in series with normally-open interlock switch 98 (Figures 3, 5 and 13). Relay 238 has normally-open contacts 238C1 and 238C2 and normally-closed contact 238C3. Circuit branch 223 has thermal overload contacts 198C5 and 198'C5 in series and forming part of the commercial starter and reversing mechanism 198 already described. The starter has magnet coils 198 and 198' which are respectively in parallel circuit branches 240 and 241. Each branch contains one of the normally-open contacts 242C1 and 243C1 actuated by differential relay coils 242 and 243 shown in Figure 14. The respective differential relay coils as later explained energize clockwise and counterclockwise actuation of the turrets and therefore contact 242C1 may be regarded as a clockwise-actuating contact and contact 243C1 may be regarded as a counter-clockwise-actuating contact.

The two circuit branches 240 and 241 are connected together through normally-open contacts 238C1 of interlock relay 238, and beyond the contacts 238C1 are connected through three-position selector switch 244 having movable contact 244C1, and fixed contact 244C2, connecting across to complete circuit branch 223 for operation, having off position 244C3, and having opposite fixed contact 244C4 for tooling control. Switch 244 is of double pole character, having a mechanical interconnection 245 to another movable contact 244C5 which operates between fixed contact 244C6, and off position 244C7.

From circuit branch 240 between coil 198 and contacts 242C1, lead 246 connects to manual turret push button switch 247, connecting by lead 248 to circuit branch 222 between interlock relay 238 and switch 98. Likewise from circuit branch 241 between coil 198' and contacts 243C1, lead 250 connects to turret reversing push button switch 251 which similarly connects to lead 248. It will be understood that by depressing push button switches 247 or 251, as the case may be, the turrets may be moved to any desired position as for tooling.

When push button switches 247 and 251 are used, selector switch 244 must be thrown to place movable contact 244C1 in contact with fixed contact 244C4, which connects with circuit branch 230 including relay 252 having normally-open contacts 252C1, and normally-closed contacts 252C2 positioned as later explained.

Circuit branch 224 contains relay 203, which at the opposite side from lead 213 is connected in parallel through normally-open contacts 198'C4 to circuit branch 241 between relay 198' and normally-open contacts 243C1 and also through normally-open contacts 198C4 of the starter and reversing switch 198 to circuit branch 240 between starter coil 198 and normally-open contacts 242C1. Likewise there is a connection from circuit branch 240 between starter coil 198 and normally-open contacts 242C1 through normally-open contacts 253C1 of 180° position operating relay 253 in circuit branch 231 later to be described. At the opposite side of contacts 253C1 connection is made to circuit branches 240 and 241 on the side of their respective contacts 242C1 and 243C1 adjoining contacts 238C1. It will be understood that contacts 198C4 and 198'C4 respectively correspond to clockwise and counter-clockwise rotation as the case may be, but actually merely serve to maintain relay 203.

In circuit branch 225 relay 254 is connected between lead 213 and point 255 which is common to circuit branches 240 and 241 between contacts 242C1 and 243C1 respectively, and contact 238C1. Normally-open contacts 254C1 of relay 254 appear in circuit branch 233.

In circuit branch 226 exhaust solenoid 93 of the pin actuating air cylinder is in series with normally-open contacts 256C1 of interlock relay 256 in circuit branch 227. Relay 256 has normally-closed contacts 256C2 in circuit branch 228 to be described. Solenoid 93 and contacts 256C1 in series are connected at 257 with circuit branch 227 as later described. In circuit branch 227 interlock relay 256 is in series with normally-closed contacts 253C2, and with normally-closed contacts 258C1 of interlock relay 258 of circuit branch 232. The circuit branch 227 is connected at point 257 with circuit branch 226 on the side remote from lead 213. Circuit branch 227 continues through normally-open contacts 238C2 and point 260 to contact 177C1 of select-operating switch 177.

Points 257 and 260 on circuit branch 227 are also connected through normally-open contacts 258C2 of interlock relay 258 and through normally-open contacts 253C3 of interlock relay 253.

Circuit branch 228 extends from lead 213 to point 260 on circuit branch 227 and includes fluid pressure-applying solenoid 92 of the pin actuating air cylinder in series with normally-closed contacts 252C2 and 256C2, and with normally-open contacts 238C2, 258C2 and 253C3 respectively in parallel.

Circuit branch 230 includes interlock relay 252 which is connected at the side remote from lead 213 to tooling contact 244C4 of switch 244 and through normally-open contacts 252C1 with circuit branch 228 between solenoid 92 and normally-closed contacts 252C2.

Circuit branch 231 includes interlock relay 253 which at the side remote from lead 213 is connected through normally-open contacts 258C3 to select-operate switch contact 177C2, and also through normally-open contacts 253C4 and normally-closed contacts 258C4 and 238C3 respectively in parallel to lead 216.

Circuit branch 232 includes interlock relay 258 which is connected to the opposite side of the line through normally-open contacts 242C2 and 243C2 in parallel, which are respectively clockwise and counter-clockwise actuating contacts of differential relay coils 242 and 243.

In circuit branch 233 rotary solenoid 178 is connected through normally-open contacts 254C1 and rectifier 260 to the opposite lead 216. Circuit branch 234 includes smoothing capacitor 261 which is connected from lead 213 to circuit branch 233 between contacts 254C1 and rectifier 260.

Circuit branch 235 includes the rotor 262 of the command self synchronous generator 165, connected to contact 244C6 of switch 244.

Command self synchronous generator 165 has a two phase stator 263 which is connected by leads 264, 265, 266 and 267 to the two phase stator 268 of the control transformer or self synchronous receiver 190.

The rotor 270 of the self synchronous control transformer 190 is connected to ground through lead 271 at one side, and at the other side through resistors 272, 273 and 274 in series. Capacitor 275 is connected from a point between resistors 272 and 273 and at the other side is connected to ground. The control circuit is also preferably grounded by grounding lead 113 at 276.

Input to the amplifier discriminator is taken off at a point between network resistors 273 and 274 to the control grid of first stage amplifier tube half 277 (the first stage amplifier tube half is suggested diagrammatically in Figure 13 and repeated in Figure 14 where the rest of the amplifier-discriminator is shown). The various amplifier stages may desirably be embodied in vacuum tube amplifiers according to tube type 6SL7, although it will be understood that any other convenient and suitable tube type may be used.

The network composed of resistors 272, 273 and 274 and capacitor 275 serves to correct for phase shift in the self synchronous rotor 270 and also attenuates the input signal to the first amplification stage sufficiently to keep the signal amplitude within the range of the first stage.

It will be understood that the vacuum tubes involved in the amplifier-discriminator circuit are of the heater cathode type and that the heater circuits will suitably be conventional as suggested later in the description.

In the first amplification stage, tube half 277, the cathode is grounded at 278 and the anode is connected to the control grid of signal control tube half 280 through a capacitor-resistor coupling network including series capacitor 281 and resistor 282 and shunt resistor 283 connected between the plate of tube half 277 and the output side of the tube half 280 as later described.

In control tube 280 the cathode is grounded at 284. The anode is connected to the control grids of discriminator vacuum tube halves 285 and 286 through coupling consisting of series capacitor 287 and resistor 288 connected from the anode of tube half 280 to the side of coupling resistor 283 remote from the anode of tube half 277, and also connected to the plate supply source through plate supply resistor 290, choke 291 and the cathode of full wave rectifier tube 292 which may suitably be of type 6X5.

The resistor 290 is also connected to ground through bias resistor 293 and a potentiometer 294, which has slide wire 295 connected to biasing resistor 296 and potentiometer 297 in series. The potentiometer 297 at the opposite side connects between capacitor 281 and resistor 282 in the coupling between tube halves 277 and 280. The slide wire 298 of potentiometer 297 is connected to the positive terminal 300 of rectifier bridge 301 and is also connected through capacitor 302 to ground. The rectifier bridge includes rectifiers 303, 304, 305 and 306 which are connected with the positive sides in the same direction on the two halves of the bridge. The negative side of the bridge diametrically opposite from the positive side is grounded at 307. Leads 308 and 309 connect respectively to points intermediate between rectifiers 306 and 303 and rectifiers 305 and 304 respectively and are in series with adjustable resistor 310 and also with the rotor of tachometer generator 210.

It will be evident that the tachometer generator by its voltage signal controls the magnitude of the D. C. voltage which is produced by the rectifier bridge and which is impressed on the control grid of tube 280 through a portion of the potentiometer 297 and the coupling resistor 282.

It will thus be seen that potentiometer 294 and potentiometer 297 adjust tube 280 for a predetermined fixed bias and this bias is regulated or modified by a variable bias superimposed by the tachometer generator through the rectifier.

The discriminator-tube halves 285 and 286 have their control grids connected together as already explained. The control grids are also biased by a network consisting of resistor 311 which is connected to slide wire 312 of the potentiometer 313, one end of which is grounded through resistor 314, and the other end of which is connected to the mid tap 315 of secondary 317 of power supply transformer 316. The lead connecting the potentiometer 313 with the mid tap 315 of power supply transformer secondary 317 is connected to ground through filter capacitors 318 and 320, and the cathode of full wave rectifier tube 292 is also grounded through capacitor 320, connected between capacitors 318 and 320.

The full wave rectifier tube has duplicate plates connected to the outside terminals 321 and 322 of the power supply transformer secondary 317. The rectifier circuit also contains capacitor 323 connected between filter choke 291 at the side adjoining resistor 293 and ground.

The power transformer is energized from leads 217, through cut-out switch 219, supplying its primary 324 suitably with alternating current at 110 volts and 60 cycles. The power transformer also has a heater secondary 325 which supplies a series of heaters 326 for the various tubes. It will be understood that there are common heaters in the twin triodes.

The plates of discriminator tube halves 285 and 286 are respectively connected to the equal secondaries 327 and 328 of plate supply discriminator transformer 330 having a primary 331 energized from the leads 217 in parallel with the primary of transformer 316. The connections of the plates are opposite so that the two transformer secondaries 327 and 328 are opposed and magnetically buck one another. The opposite ends of the respective transformer secondaries are connected through differential relay windings 242 and 243 and test jacks 332 and 333 to a common point 334 connected to the cathodes of the respective discriminator tube halves and also connected to ground. The differential relay coils 242 and 243 are respectively shunted by holding capacitors 335 and 336. The differential relay coils 242 and 243 operate on the same armature and each mechanically opposes the pull on the armature of the other differential relay coil so that only one of the relays can reach a limiting position at one time and when the relays are pulling equally the armature will be in a mid or null position.

Discriminator vacuum tubes 285 and 286 are suitably halves of a vacuum tube of type 6SN7.

The following are examples of the parameters of circuit elements which have been found desirable when operating the system of the invention under 220 volts, 60 cycle alternating current on the driving motor and 110 volts 60 cycle alternating current for the control system.

The capacitors 204, 205 and 206 are each desirably of 160 to 190 microfarads.

In the circuit of Figure 14, network resistor 272 is 10,000 ohms, 1 watt.

Network resistor 273 is 100,000 ohms, 1 watt.

Network resistors 274 and 314 are 15,000 ohms, 1 watt.

Capacitor 275 is 0.2 microfarad, 250 volts paper insulation.

Tubes 277 and 280 are each ½ of the tube type 6SL7–GT glass octal Hi-Mu twin triode.

Tubes 285 and 286 are each ½ of tube type 6SN7–GT glass octal Med-Mu twin triode.

Tube 292 is a 6X5–GT glass octal full wave rectifier tube.

Resistors 283, 288, 293 and 296 are of 240,000 ohms, 1 watt. Resistors 282 and 311 are each of 510,000 ohms, 1 watt. Resistor 272 is of 10,000 ohms, 1 watt. Resistor 290 is of 51,000 ohms, 1 watt.

Potentiometer 297 is of 500,000 ohms, 1 watt.

Potentiometer 294 is 1 megohm.

Potentiometer 313 is of 5,000 ohms, 1 watt, wire wound.

Potentiometer 310 is of 50,000 ohms, 1 watt.

Capacitors 281 and 287 are 0.06 microfarad, 450 volt, paper insulation.

Capacitor 323 is 4.0 microfarads, 450 volts, electrolytic.

Capacitors 318 and 320 are 0.5 microfarad, 600 volts, paper insulation.

Capacitors 335 and 336 are 1.0 microfarad, 450 volts, electrolytic.

Capacitor 302 is 1.0 microfarad, 400 volts, paper insulation.

Plate filament transformer 324 is 580 volts CT 90 ma. 6.3 volt heater 2.8 amperes.

Plate transformer 331 is 360–0–0–360 volts, 70 ma.

Differential relay 242, 243 is 10,000 ohms, 1.3 ma. pull in 0.4 ma. drop out current per coil.

Tachometer generator 210 is permanent magnet type 10 volts A. C. per 1,000 R. P. M.

Choke 291 is 8–24 henry (swinging). 12 henry 375 ohms at 80 ma.

Rectifiers 303 to 306 are 20 ma. selenium stacks.

*Operation*

The null point of the system is preferably adjusted as follows before the system is used. As previously explained in reference to Figure 7, self-synchronous generator 165 is secured to mounting plate 167 which is rotatably adjustable by releasing screws 170 in elongated mounting holes 171. Holes 171 will permit rotation of mounting plate 167, and consequently the stator of generator 165 through a maximum angle of 45 degrees. In a similar manner, referring to Figure 4, response self-synchronous control transformer 190 may also be rotated through a maximum angle of 45 degrees. Thus, it will be evident that by combining these mechanical adjustments a maximum displacement of 90 degrees is possible between the stators of the generator and control transformer. Obviously the same effect could be accomplished by positioning the rotors of the generator and control transformer, but this is more difficult and less handy than the stator method.

In self-synchronous systems employing a generator and control transformer, electrical "null" (zero voltage output at control transformer rotor terminals) is defined as the relative angular position of generator-control transformer rotors which is 90 degrees removed from the relative angular rotor position which produces maximum voltage at the control transformer rotor terminals. Accurate adjustment of electrical "null" is difficult to obtain by ordinary voltmeter methods.

A simple accurate method of obtaining the mechanical-electrical null point for the system of this device was developed. The self-synchronous generator 165 and control transformer 190 are installed and their respective rotors connected to their individual driving means without regard to the relative angular relation between rotors. The turrets may then be placed at any convenient tool location and secured by index pins 70 so that the rotor of control transformer 190 is locked at this position. Selector unit 28 is then positioned so that the selector arm index pointer 145 matches the corresponding turret location on dial 146. The rotor of command generator 165 will be locked in this position when index plate 160 registers with tapered locking key 173 and mechanical system null has been established.

Amplifier-discriminator 32 may now be energized and allowed to warm-up for approximately 15 minutes to permit stabilization of circuit components. Three position selector switch 244 must be set to "off" position 244C3 and 244C7 thus removing excitation from rotor 262 of the command generator.

After amplifier warm-up, plate currents in the discriminator tube sections 285 and 286 are read, using a suitable test plug inserted into test jacks 332 and 333 (Figure 14) and a D. C. meter. The meter should preferably have two scales; 0–25 milliamperes for preliminary readings, and 0–1 milliampere for final readings. Amplifier gain sensitivity should preferably be adjusted to maximum by moving contact 295 of potentiometer 294 to the ground end of the winding. The plate currents read under these conditions indicate normal discriminator output for zero signal input. The currents should be accurately noted and recorded. The currents in tube halves 285 and 286 will not necessarily be equal, but should not differ by more than 0.5 milliampere. Excitation at 110 volts 60 cycles is now supplied to rotor 262 of the command generator. This is accomplished by closing switch 244 on contacts 244C2 and 244C6. Plate currents are again checked and adjusted to the values obtained previously for zero signal input by positioning the stators of the generator and/or control transformer as previously described. When zero signal input current conditions have been obtained the system is at electrical null and the stators may be locked.

Prior to the actuating of the device, the amplifier is allowed to warm up for approximately one minute. This is controlled by thermal time delay relay 236, which closes normally-open contacts 236C1, energizing interlock relay 215, which closes normally-open contacts 215C1 and supplies power to the remaining control circuits.

It may be assumed that the work is in position on the work table, and any desired punching operation has just been completed, placing the turrets in any one of the available positions, with the indexing pins in engagement in the appropriate indexing openings. The punching operation at the particular station having been completed, the operator moves the work to bring the next location of punching into line with the punching axis by manipulating the work table. He will ordinarily be guided in this by a chart showing the reference dimensions for the next punching operation, and indicating the identification (usually the number) of the turret station at which the appropriate punch and die are located.

It is then desired to manipulate the turrets to the correct location as quickly and as smoothly as possible. The operator first depresses selector push button 128, which depresses selector actuating lever 137 to the position of Figure 8, depressing plunger 147 against the action of spring 148, and causing the plunger to move down around shaft 156 because of the relative freedom provided by slots 153 in the plunger. As the plunger moves down it carries with it index plate 160, causing the index plate to disengage from index key 173 so that the selector arm 124, plunger and shaft 156 are free to turn.

To select in the usual way, switch 244 must be in the "on" position corresponding to contact between 244C1 and 244C2 and causing contact between 244C5 and 244C6. (This is the position shown in Figure 13.) The depressing of index plate 160 causes select-operate switch 177 to shift from the operating position in which contact 177C3 engages contact 177C1 to the select position in which contact 177C3 engages contact 177C2. At this moment contacts 258C3 are open, and no electrical action takes place until the selector arm beings to turn. Contacts 258C3 prevent inadvertent action in case someone pushes down on the push button and immediately releases.

The selector arm may now be turned rapidly in either direction (the operator should select the nearest route to the next position), toward the desired position.

As soon as the operator turns the selector arm, causing pivot element 125, plunger 147, shaft 156 and self-synchronous command generator 165 to turn, the rotor of the command generator is displaced from its previous position through an angle corresponding to the desired motion of the turrets to the new position. It will be evident that this angle of displacement is the same regardless of whether the operator manipulates the selector arm to the new position by the shortest route or by the longest route, and therefore the ability of the operator to select the shortest route makes no difference in the automatic angular response of the turrets.

The angular displacement of the rotor of the command generator is converted by the command generator in cooperation with the response unit into an electrical impulse which is a function of the angle of error between the command generator rotor and the response rotor. The error signal in the rotor 270 of the self synchronous response unit is amplified and discriminated as described below to cause actuation of one or the other of the differential relay coils 242 or 243. Let us assume that differential relay coil 242 is energized, causing contacts 242C1 and 242C2 to close. When contact 242C1 closes, no electrical action occurs immediately because normally-open contacts 238C1 are still open. When contact 242C2 closes, control relay 258 is energized, closing normally-open contacts 258C2 and 258C3 and opening normally-closed contacts 258C1 and 258C4. The closing of normally-open contact 258C2 causes no electrical action immediately because select-operate switch 177 is in the select position with contact 177C3 engaging contact 177C2. The opening of normally-closed contacts 258C1 and 258C4 causes no electrical action at this point, but provides interlocks for controlling other relays later described.

The closing of normally-open contacts 258C3 energizes control relay 253, which is maintained by closing of normally-open contacts 253C4 through normally-closed contacts 238C3. Closing of normally-open contacts 253C1 causes no action at this stage because normally-open contacts 238C1 are still open. Closing of normally-open contacts 253C3 causes no action at this stage because the select-operate switch is in the select position with contact 177C3 engaging contact 177C2. Opening of normally-closed contacts 253C2 likewise causes no effect at this stage because switch 177 is in the select position with contact 177C3 engaging contact 177C2. No further electrical action takes place while the operator maintains the push button in depressed position.

When the operator has reached the new position which is being selected, the push button 128 is released, permitting the lever 137 and plunger 147 to retract to the position of Figure 7, and causing one of the holes 172' of index plate 160 to engage around index key 173 at the newly selected position. This shifts select-operate switch 177 to the operating position, bringing contact 177C3 into engagement with contact 177C1. When this takes place, index pin actuating valve solenoid 92 is energized through normally-open contacts 258C2 and 253C3 which are closed in parallel, and through normally closed contacts 256C2 and 252C2.

Referring to Figure 6, energizing of pin actuating valve solenoid 92 causes pressure fluid such as compressed air to actuate the index pin operating piston 84, withdrawing index pins 70 from engagement with the respective turrets. As the index pins withdraw, normally-open switch 98 closes, energizing interlock relay 238, and causing normally-open contacts 238C1 and 238C2 to close, and normally-closed contacts 238C3 to open. Assuming that the selection is of some position more than zero and less than 180° removed from the last position, the opening of normally-closed contacts 238C3 will deenergize control relay 253, opening normally-open contacts 253C3, 253C4 and 253C1 and closing normally-closed contacts 253C2. This removes from the circuit the contacts associated with the energizing of relay 253 which is important only in the solution of a 180° displacement problem. Closing of normally-open contacts 238C2 prevents the premature deenergizing of relay 256 and solenoid 92 at later stages in the operation.

Closing of normally open contacts 238C1 energizes operating coil 198 of the reversing starting switch, since normally-open contacts 242C1 were closed during selection by the differential relay. The energizing of coil 198 causes contacts 198C1, C2 and C3 of the starter to close and also closes normally-open interlock contacts 198C4.

Due to the closing of contacts 198C4, contactor coil 203 is energized, closing normally-open contact 203C1, C2 and C3 which are in series with starter contacts 198C1, C2 and C3 respectively. This also opens normally-closed contacts 203C4, C5 and C6, rendering the braking capacitors inoperative at this stage. Turret motor 63 is then energized, and drives the turrets in the direction which has been determined by the differential relay and the choice of starter contacts 198C1, C2 and C3 rather than reversing starting contacts 198'C1, C2 and C3.

The closing of normally-open contacts 238C1 has also energized control relay 254, which closes normally-open contacts 254C1, energizing rotary solenoid 178 to actuate the cam lock and hold the index plate in non-selecting position as shown in Figure 10.

As the solution of the problem approaches, and the angular error decreases to a predetermined increment before the solution, the amplifier-discriminator as later described causes differential relay 242 to deenergize, opening normally-open contacts 242C1 and 242C2, deenergizing starter coil 198, and opening contacts 198C1, 198C2 and 198C3 and 198C4, and deenergizing relay 203. When relay 203 deenergizes, normally-open contacts 203C1, C2 and C3 open, cutting off power from the turret motor 63 while at the same time closing normally-closed contacts 203C4, C5 and C6 to connect the turret motor field across braking capacitors 204, 205 and 206 respectively in each phase. Thus a braking countertorque is created in the turret motor which causes rapid deceleration of the motor and of the turrets. Interlock relay 258 is deenergized, closing normally-closed contacts 258C1 and energizing interlock relay 256. Interlock relay 256 closes normally-open contacts 256C1, energizing solenoid 93 opening the exhaust valve to exhaust the index pin cylinder and opening normally-closed contacts 256C2 which deenergizes the solenoid 92 of the pressure valve for the index pin cylinder, so that the index pins are released under the pressure of springs 71 and tend to ride along the outsides of the turrets waiting for registry with the openings which will shortly be encountered.

Switch 98 is still not deactuated as the pins must actually enter into the index recesses before switch 98 can open. All other contacts associated with relay 258 are returned to normal position without accomplishing any additional electrical action at this stage.

The capacitor braking here employed has the advantage that the effectiveness of the braking is greatest at maximum speed and decreases as the speed drops off so that only a portion of the kinetic energy is absorbed in the braking and a substantial amount of kinetic energy remains to the end to carry the turrets into position in registry with the index pins.

In operation of the capacitor braking, the capacitors are applied across the individual phase windings of the stator of the induction motor. Immediately after the main power source is disconnected from the stator, and while the motor is turning at full speed, the capacitors are shunted across the individual phase windings. Electrical energy in the winding is absorbed by the capacitors, resulting in a more rapid deceleration of the rotor, since the energy stored by the capacitor is pumped back into the rotor, creating a counter torque.

When the index pins reach the position of registry with the index recesses of the turrets, the pins enter the turrets, which are then moving very slowly and have only a slight tendency to over-travel predetermined by the size of the capacitors for capacitor braking and by the sensitivity of the amplifier which determines the release point of the pins.

As the pins enter the index recesses (and suitably before they completely seat) switch 98 opens, deenergizing relay 238, opening normally open contacts 238C1 and 238C2 and closing normally closed contacts 238C3. Opening of contacts 238C2 deenergizes relay 256 and returns all contacts associated therewith to normal position. Opening of contacts 238C1 deenergizes relay 254, which opens normally open contacts 254C1. Opening of normally open contacts 254C1 opens the circuit of rotary solenoid 178, unlocking the index plate. All relays and other elements are now in normal operating condition ready for the next selection sequence.

The above discussion applies to any selector position different from the initial position other than one which is 180° removed from the previous position. In the case of the selection of a position 180° removed from the previous position, it will be understood that the signal initially generated by the self synchronous command generator is the same signal which would be obtained at zero degrees displacement, and therefore there will be no action of the differential relay unless special steps are taken. Accordingly the following procedure is followed with every selection to take care of the possibility that it might be a selection requiring the solution of the 180° problem. As already described, 180° relay 253 is energized as a result of differential relay action. During selection, relay 253 is energized, causing normally open contacts 253C1 to close, but not causing any energizing of starter coil 198 at that stage because contacts 238C1 are open. As the self synchronous command generator moves to the final position, contacts 253C1 remain closed, but if the final position is a position other than the 180° position one of the differential relays is energized and by action of control relay 258 causes normally-closed contacts 258C4 to open, which deenergizes 180° solution relay 253. If, however, when selection has been made, the differential relay drops out because the solution is a 180° solution which creates no impulse to maintain the differential relay actuation, then relay 258 is deenergized and allows the 180° relay 253 to be maintained. Therefore starter coil 198 is energized through normally-open contacts 253C1 when normally-open contacts 238C1 are closed. This therefore begins operation in the usual manner. As soon as the turrets begin to move toward the new position and get out of the dead beat area, the self synchronous command generator ceases to be 180° removed from the response unit, and normal actuation takes place, the proper differential relay coil picking up and the remainder of the movement occurring in the manner already described for any other angle between zero and 180°.

Once the differential relay has actuated, the application of braking and the return of the index pins occurs in the manner already described.

It will be evident that the turrets can be manipulated for the purpose of installing and removing tooling by closing switch 247 or switch 251 to actuate the turrets in one direction or the other provided that selector switch 244 is shifted to bring contact 244C1 into engagement with contact 244C4. The shifting of selector switch 244 to the tooling position actuates control relay 252 to withdraw the pins and hold them out. From then on the turrets can be turned simply by actuating starter coil 198 or 198' as the case may be. It will be noted that whenever the starter coil is released, capacitor braking will function. The index pins will not however register until the operator manually returns the selector switch 244 to the normal operating position. It will be understood that by providing a suitable remote operation of switches 247 and 251 they may be utilized as emergency devices in case of failure of equipment which prevents normal operation.

The action of the amplifier-discriminator will best be understood by reference to Figure 14 considered in connection with Figure 13.

The response unit functions in the familiar manner of a control transformer by development of a sinusoidal voltage output which is a function of the magnitude and the phase of the angular error between the command unit and the response unit. The circuit of Figure 14 amplifies and accomplishes phase distinction of the error signal.

When an error signal is created in the rotor 270 of the self synchronous response unit, the signal is imposed upon the network consisting of series resistors 272, 273 and 274 in parallel with capacitor 275, and it appears as a voltage on the control grid of amplifier tube half 277. The error voltage is amplified and applied through coupling consisting of capacitor 281, resistor 282 and parallel resistor 283 to the control grid of control tube half 280.

The network of resistors 272, 273 and 274 and capacitor 275 accomplishes phase shift and attenuation of the error signal for the input stage of the amplifier-discriminator. Tube half 277 functions in the linear region of its transfer characteristic (the region of steep slope intermediate between the upper and lower bends adjoining the positive and negative extremities of bias) and tube half 277 functions in amplification in the usual manner. Assuming that the tube characteristics remain constant throughout the operating range, the varying component of plate voltage across resistor 283 accurately reproduces the input voltage wave form and is timed in phase with the input signal. The varying component of the plate voltage, while having the same wave form, is 180° displaced in phase with respect to the input voltage on the grid of tube half 277. The alternating voltage across resistor 283 is transferred to the control grid of the control tube 280 by the coupling network described.

The grid bias voltage of control tube half 280 is adjusted so that the operating range of the tube lies within the range AB of the transfer characteristic curve for tube half 280 as shown in Figure 15, plotting plate current in milliamperes as the ordinates and grid bias in volts as the abscissae. The grid bias limits for this operation are beyond the upper point of inflection in the transfer characteristic curve. The fixed bias adjustment of the grid bias of tube half 280 is accomplished by adjustment of slide wire 295 on potentiometer 294. The range of the potentiometer is adequate to provide adjustment between the limits of point A and point B on the curve of Figure 15, and thus provides the operator with a means of controlling the gain sensitivity of the amplifier, and thus controlling the level of signal magnitude which is a function of the angular error at which the energized differential relay will deenergize and the capacitor braking will be applied. Thus if on a given capacitor braking application the turrets possess too much kinetic energy when the index pins set, causing a jolt in operation, this can readily be eliminated by adjusting the potentiometer 294. Conversely if the turrets tend to fall short in coming to registry position, this can readily be corrected by adjusting potentiometer 294.

The fixed bias determined by the setting of potentiometer 294 is supplemented by tachometer feed back bias created by tachometer generator 210 (Figures 5, 6, 13 and 14) acting through the rectifier network. The tachometer generator creates a linear alternating current voltage which is proportional to the speed of the turret motor from approximately 150 R. P. M. to full motor speed. The major function of the tachometer generator is to provide a correction when relatively small angular total errors are encountered which prevent the turret motor from building up to maximum speed. Under these conditions it is likely that insufficient kinetic energy would remain after capacitor braking to bring the turrets to registry. The tachometer feed back voltage superimposed on the fixed bias of control vacuum tube 280 causes the bias setting under the particular conditions to move toward point B on the curve of Figure 15 as speed increases. At zero speed the bias point will correspond to the setting of potentiometer 294, and will be at or close to point A. Since the release point of the index pins with respect to the null point of the self synchronous system is a function of the sensitivity of the amplifier, the effect of the feed back control is to vary the angular displacement between the release point and the null point in accordance with the rate of change in amplitude of the error signal voltage, which is a function of the angular speed of closure on the system null point.

Therefore, in all cases where the turrets attain a speed in the solution of a particular problem which is less than the speed corresponding to that at which the turrets are moved under maximum motor speed, the locking pins are released at some angle less than the normal lead angle provided for release which has been selected with reference to the null point in the present system so that the kinetic energy after application of capacitor braking is then just sufficient to drive the turrets to the null point, with a very slight factor of safety.

It will be evident from the discussion that if the tachometer feed back voltage tends to decrease the amplifier sensitivity as the turret drive motor is speeding up, it will tend to increase the amplifier sensitivity as the turret drive motor is being braked to a stop. Thus amplifier sensitivity will increase during braking, and this could result in false operation due to reclosure of the differential relay contacts before the turret locking pins engage the turrets. This difficulty is readily overcome by selecting the parameters of the tachometer feed back circuit so that a time delay is introduced which prevents any bias shifting until the pins have actually entered the index recesses. Capacitor 302 charges to the full direct current voltage of the rectifier network during tachometer operation, and during braking of the tachometer to a stop, the charge on this capacitor leaks off through potentiometer 297, resistor 296 and the portion of potentiometer 294 to ground, the rate of discharge being determined by the parameters of the resistors. Capacitor 302 also smooths out the wave in the rectifier. The rectifier network is suitably a metallic rectifier system, such as a selenium rectifier, arranged in bridge form so that regardless of the direction of the rotation of the turrets a positive pulse will always appear at the point 300, the tachometer being connected to positions on the bridge 90° displaced from the points of bias take-off.

In control tube 280 the operation is in the non-linear range of the transfer characteristic, and the wave forms of the plate current and voltage will not correspond to the wave forms of the input grid voltage. The plate current in control tube 280 will actually flow only during a portion of the negative half cycle of the grid voltage wave. This produces a distorted output voltage wave form. However, the varying components of plate current and the voltage across resistor 288 are in time phase, and the varying component of the plate voltage is approximately 180° out of phase with the current and voltage across resistor 288. The varying component of voltage across resistor 288 is transferred to the grids of discriminator tube halves 285 and 286 by capacitor 287.

Phase discrimination of the error signal voltage is necessary to permit rotation of the turrets in either direction. Phase discrimination is accomplished in the circuit of Figure 14 by comparing the error voltage with two independent equal reference voltages which are 180° out of phase with one another. Wave form distortion is not a serious problem provided the varying components of voltage impressed upon the grids of discriminator tube halves 285 and 286 are very nearly in time phase with one or the other of the reference voltage waves impressed upon the plates of these respective tubes. This condition will prevail if proper circuit parameters are employed in the phase shifting network on the input circuit of the amplifier.

The plates of discriminator tubes 285 and 286 are connected to opposite ends of independent transformer secondary windings, the adjacent ends of which are connected to ground through the operating coils of a pair of sensitive differential relay coils. Obviously in this arrangement when the plate of the discriminator tube half 285 swings positive, the plate of discriminator tube half 286 swings negative. Regardless of the grid conditions at any instant, these tubes can only conduct current during the positive half cycle of their respective plate potentials. Furthermore in order for the plate current of discriminator tube 285 or 286 to increase at all, it is necessary that the respective grid and plate potentials be in time phase. In this manner phase discrimination of the signal is accomplished. If a positive phase (clockwise) signal is present, the plate voltage of positive discriminator tube half 285 must be in time phase with its grid voltage and a resultant increase in plate current will take place causing clockwise differential relay coil 242 to function. Since the plate voltage and grid voltage are 180° out of phase in the other discriminator tube 286 at this instant, the plate circuit of discriminator tube 286 will remain quiescent and differential relay coil 243 will not operate.

On the other hand if a negative phase or counterclockwise signal is received by the discriminator tubes, the condition will be exactly opposite and the counterclockwise differential relay coil 243 will function.

Holding capacitors 335 and 336 shunted across the differential relay coils prevent the relays from dropping out during the negative half cycles of the voltage waves. The capacitors charge during the positive half cycles and discharge through the relay coils during the negative half cycles thus maintaining the relay contacts in closed position.

The fixed bias of the discriminator tubes is adjusted by potentiometer 312 so that the operating points of the discriminator tubes are close to the cutoff points. The quiescent plate currents are, therefore, very small, being suitably of the order of 4 to 6 micro-amperes. Accordingly the discriminator tubes respond only to the positive half cycles of the grid input voltage and the composite plate currents increase to some higher average value.

The differential relay itself may be a conventional type of three position differential relay having a pick-up position for one relay coil, neutral position and a pick-up position for the opposite relay coil, with snap action from one position to another as well known. Suitable detents and springs, well known in the art, may be employed to hold the relay in the neutral position at which all contacts are open. When the current increases in one relay coil with respect to that in the other, the armature which is acted on by both relay coils will retain its neutral position until the disparity in the relay coil currents reaches a predetermined value and then will snap in the direction of the energizing coil. The relay contacts shown are of the double break type to increase the performance life.

In summary of the operation as previously described, the following are the principal steps:

(1) In making a selection, the selector push button, operating lever and plunger are depressed, moving down the index plate till it is free of the index key. This causes select-operate switch 177 to shift to select position, and this disconnects the amplifier from the circuit so that no turret motion can take place during selection.

(2) When the selection arm is rotated toward the new selection position, an error impulse develops in the self synchronous system, which is applied to the amplifier-discriminator. The error impulse is attenuated and shifted in phase by the input network, and amplified by the first vacuum tube stage. It is then further amplified by the control tube and the output of the control tube acting under its fixed bias passes to the discriminator tubes. Each of the discriminator tubes is subjected to a cathode-to-plate comparison voltage equal and opposite in phase, and valve action occurs in that discriminator tube in which the input signal is close in time phase to the comparison voltage. The tube in which valve action occurs causes pick-up by the differential relay coil in the direction corresponding to the controlling differential coil, closing contacts which at a later stage are to dictate operation of the turret motor and the turrets in a corresponding direction. If the path of selector motion is greater than 180°, first one differential relay coil will pick up and drop and then the other differential relay coil will pick up as 180° is passed. The final differential relay coil which remains in energized position will control the direction of motion, which will be the shortest route to the selective position, regardless of the route taken in selection.

(3) When the selection is complete, operation begins and control relay 253 is energized (through the intermediate action of control relay 258), relay 253 closes the contact 253C1 which at the end of selection energizes the turret motor in a predetermined direction unless at the time of the completion of selection one of the differential relay coils has energized, in which case relay 253 which starts action in case of a 180° problem, is no longer needed and is removed from the circuit. Thus relay 253 is introduced in the case of every problem and creates a condition for predetermined operation of the turret motor, which condition is rendered inoperative if an angular problem more than zero and less than 180° has been established at the end of selection.

(4) Upon the completion of selection, the selecting mechanism is electrically and mechanically locked out and remains locked until the driving cycle is completed.

(5) At the end of selection, electrical-pneumatic mechanism withdraws the index pins and they remain out of engagement with the turrets until a predetermined time before registry, when the index pins are spring urged against the periphery of the turrets and ride the turrets until registry is attained.

(6) The withdrawal of the index pins causes energization of one of the pair of reverse operating motor starter coils, the particular motor starter coil being determined by the identity of the differential relay coil which is energized during selection (if more than one differential relay coil is energized during selection the coil which controls is the final coil) and if no differential relay coil remains energized at the end of selection then the starter coil to be energized is determined by relay 253 which deals with the case of the 180° problem. Concurrently with the energizing of the starter coil, the capacitor braking contactor 203 is energized and the capacitors are disconnected from the circuit. Also power is then applied to the windings of the turret motor.

(7) When the driving motor 63 begins to function, the sensitivity of the amplifier which controls the ability of the differential relay coil which has picked up to remain energized on the amplified error signal energy is controlled entirely by the fixed bias of control tube 280. As the speed of the turrets increases, the tachometer generator and associated rectifier circuit delivers an increasing positive impulse, which supplements the fixed bias of control tube 280 and, as the speed increases, reduces the sensitivity of the amplifier in proportion to the speed. As the angular error decreases the error impulse decreases, and the tendency of the differential relay to drop out increases, until a level is attained at which the differential relay can no longer hold. As the turret speed increases the rectified tachometer generator feed back bias increases, reducing the sensitivity of the amplifier, so that the reduced error signal is less able to maintain the differential relay than would be the case with more amplifier sensitivity. Therefore the greater the speed of the turrets, the farther ahead of the registry point will the differential relay drop out, deenergizing the turret motor and applying the capacitor braking and releasing the index pins to engage the circumferences of the turrets. In case the total displacement is so small that the turrets do not have an opportunity to get up to speed, the rectified tachometer generator feed back voltage is very low, the amplifier retains high sensitivity, and the differential relay is maintained on a comparatively small error signal and does not drop out until a position comparatively close to the registry position.

(8) At the registry position the index pins enter the index recesses in the turrets, and at a predetermined depth of entry the electrical-mechanical locking of the selector is released.

It will be evident that capacitor braking has certain advantages over other types of braking, such as electromagnetic, reversed phase (plug) or D. C. dynamic braking. Apparatus required for capacitor braking is relatively simple and inexpensive. A capacitor brake will not result in motor overheating, as may be the case with reversed phase (plug) braking. There are no moving parts as in the case of magnetic-spring reset brakes. Failure of a capacitor (leaving two operative) will not seriously affect braking torque. Failure of any other braking system will, obviously, result in no braking at all.

The effective manner in which capacitor braking has been applied in this device, working cooperatively with the index pins to obtain dead beat positioning is a major factor in the overall high speed of the device. The average positioning time, including manual selection, is approximately 3.5 seconds; times ranging from 1.4 seconds for a 10° selection to 6.1 seconds for a 180° selection.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. In a remote control device for turning a turret or the like, indexing means for bringing the turret into different precise angular positions, mechanism for withdrawing and restoring the indexing means, and remote control driving means for turning the turret, including an electric motor driving the turret and means for determining a selected position to which the turret is to move and moving the turret from the previous position to the selection position, including remote control selector means under the control of the operator as to each selection which is made, and producing an error signal which is a function of the magnitude and direction of the angular error between the selector means and the turret position, electrical means for amplifying the angular error signal, electrical means for discriminating the direction of the angular error, and electrical means for selectively energizing the driving motor in a direction determined by the means for discriminating the direction.

2. A device according to claim 1, having two cooperating turrets which must be brought into registration at a plurality of different circumferential positions, in combination with indexing means for bringing both turrets into precise cooperating relationships at different angular positions, the remote control means operating to drive both turrets into different precise angular positions.

3. A device according to claim 1, in which the driving motor is an induction motor, in combination with a braking capacitor for each phase winding of the stator of the driving motor, power connections for the stator of the motor and switch means having normally open and normally closed contacts, the normally open contacts being interposed in circuit between the power connections and the phase windings of the stator, and the normally closed contacts being interposed in circuit between the stator windings and the braking capacitors to place the braking capacitors in shunt across the phase windings.

4. A device according to claim 3, in combination with means for deenergizing the motor and connecting the braking capacitors in shunt before the indexing means reaches a position to restore indexing, and means for varying the angular interval between the point at which the braking capacitors are placed in shunt and the position at which the indexing of the turret is restored.

5. A device according to claim 3, in combination with means for connecting the braking capacitors in shunt at an angular position before indexing is restored, and means responsive to the speed of travel of the turret for varying the angular position at which the braking capacitors are placed in shunt prior to the position at which indexing is restored.

6. A device according to claim 1, in combination with means for releasing the discriminating means by a predetermined angular position before the indexing means regains registry, and means for releasing the indexing means when the discriminating means is released to permit the indexing means to advance toward indexing position.

7. A device according to claim 1, in combination with means for deenergizing the discriminating means at a predetermined angular position before registry is restored in the selected position, and means for deenergizing the driving motor in response to the deenergization of the discriminating means.

8. A device according to claim 1, in which the remote control means comprises an electrical network in circuit with the error signal for attenuating and shifting the phase of the error signal, electrical means for amplifying the attenuated and phase displaced error signal, discriminator electronic means having cathodes, anodes and control grids, the control grids being connected to receive, as input, the attenuated and phase displaced error signal, means for applying comparison alternating voltages to the anodes of the discriminator electronic means, the comparison voltages being approximately 180° out of phase with respect to one another, comparison means for evaluating the relative cathode to anode external circuit currents of the comparison electronic means, means responsive to the energization of the comparison means for energizing the driving motor, and means for deenergizing the driving motor.

9. A device according to claim 1, in which the remote control means comprises an electrical network in circuit with the error signal for attenuating and shifting the phase of the error signal, vacuum tube means for amplifying the attenuated and phase replaced error signal, control vacuum tube means having a variable bias responsive to the control of the amplified and phase displaced error signal, discriminator vacuum tube means having anodes, cathodes and control grids, the control grids of which receive as input the output of the control vacuum tube means, means for applying to the anodes of the discriminator vacuum tube means comparison alternating current voltages which are respectively 180° out of phase, comparison means responsive to the relative anode-to-cathode currents in the external circuit of the respective discriminator vacuum tube means, means for energizing the driving motor in response to the direction of energization of the comparison means and means for deenergizing the driving motor in response to the deenergization of the comparison means.

10. A device according to claim 1, in which the remote control means includes an electrical network in circuit with the error signal for attenuating and shifting the phase of the error signal, vacuum tube means for amplifying the attenuated and phase displaced error signal, control vacuum tube means responsive to the control of the amplified and phase displaced error signal, means for applying a fixed bias to the control vacuum tube means, means responsive to the speed of rotation of the turret for generating an alternating voltage which is a function of the speed, means for rectifying said voltage and applying it to the control vacuum tube means as additive bias to the fixed bias, discriminator means responsive to the magnitude and phase of the output of the control vacuum tube means, means for energizing the electric driving motor in a direction responsive to the discriminator means, and means for deenergizing the electric motor in response to the deenergization of the discriminator means at a predetermined angular position prior to the position at which the turret is brought into registry.

11. A device according to claim 2, in which the turrets have indexing openings around the circumference, and in which the indexing means comprises indexing pins cooperating with the turret positions, means for withdrawing the indexing pins in unison, and means actuated by the remote control means for releasing the indexing pins when the turrets are still in motion and urging the indexing pins toward indexing positions in the openings while the indexing pins engage the circumference of the turret.

12. A device according to claim 2, in which the turrets have indexing openings around the circumference, and in which the indexing means comprises indexing pins which engage the turrets in corresponding positions, means for withdrawing the indexing pins in unison, means for releasing the indexing pins in response to the action of the remote control means while the turrets are still in motion and resilient means for urging the indexing pins against the circumference of the turrets.

13. A device according to claim 1, in which the remote control means comprises self synchronous means connecting the selector means and the turret and generating the error signal, amplifier-discriminator means for amplifying the error signal and discriminating the phase, electrical means operated by the selector means for disconnecting the amplifier-discriminator means from the driving motor during the period of selection, and means operatively connected by the amplifier-discriminator means and the driving motor and put in operation by the selector means on the completion of selection for operating the driving motor in the direction determined by the amplifier-discriminator.

14. A device according to claim 1, in which the remote control means has an input network which attenuates and shifts the phase of the error signal, control vacuum tube means having control coupling to the means for amplifying, a tachometer generator responsive to the speed of motion of the turret, generating an alternating voltage, rectifier bridge means connected at opposite points to the tachometer generator, means for supplying speed corrected bias to the control vacuum tube means from the rectifier bridge to a positive point 90° removed from the connection to the tachometer generator, a phase discriminator, and means connected to the output of the control vacuum tube means and operatively connected to energize the driving motor in a direction determined by the phase of the output of the control vacuum tube means.

15. A device according to claim 1, in which the remote control means comprises an input network which attenuates and shifts the phase of the error signal, control vacuum tube means having control coupling to the means for amplifying, a tachometer generator responsive to the speed of motion of the turret generating an alternating voltage, a rectifier bridge connected at opposite points to the tachometer generator, means for applying speed corrected bias to the control vacuum tube from the rectifier bridge at a positive point 90° removed from the connection to the tachometer generator, and a phase discriminator operatively connected to the control vacuum tube means to energize the driving motor in a direction determined by the bias and responsive to the magnitude of the error signal and to the sensitivity of the amplifier as determined by the rectifier impulse from the tachometer generator to deenergize the driving motor.

16. A device according to claim 1, which comprises an input network which attenuates and shifts the phase of the error signal, control vacuum tube means having control coupling to the means for amplifying, a tachometer generator responsive to the speed of motion of the turret generating and alternating voltage, a rectifier bridge connected at opposite points to the tachometer generator, means for supplying speed corrected bias to the control vacuum tube means from the rectifier bridge at a positive point 90° removed from the connection to the tachometer generator, discriminator vacuum tubes each having an anode, a cathode and a control grid, the control grids of which are connected to the output of the control vacuum tube means, means for applying comparison alternating voltage respectively 180° out of phase across the anodes and cathodes of the discriminator vacuum tubes, a differential relay having opposed coils each of which is connected in circuit between the anode and cathode of one of the discriminator vacuum tubes and means actuated by the differential relay in its opposed positions for energizing the driving motor in a direction determined by the differential relay and for deenergizing the driving motor.

17. A device according to claim 1, in which the remote control means comprises an amplifier-discriminator connected to receive, amplify and discriminate the phase of the error signal when an error signal exists, means operated by the amplifier-discriminator to operate the driving motor in a direction determined by the amplifier-discriminator when an error signal exists at the end of selection, and means for energizing the driving motor in a predetermined direction when no error signal exists at the end of selection, the means for energizing the driving motor in a predetermined direction being rendered inoperative by the amplifier-discriminator when an error signal is found.

18. A device according to claim 1, in which the remote control means comprises a network connected to the error signal to attenuate the error signal and change its phase, an amplifier receiving the output of the network and amplifying the same, a control vacuum tube means coupled to and controlled by the amplifier, means for applying fixed grid bias to the control vacuum tube, a tachometer generator responsive to the speed of turning of the turret, a rectifier network operatively connected at opposite points to the tachometer generator, a grid bias feedback connection from the rectifier network and operatively connected to add to the grid bias of the control vacuum tube, relay means for energizing the driving motor in a predetermined direction, phase discriminator means for receiving the output from the control vacuum tube operatively connected to the driving motor in a selected direction determined by the discriminator means and to deenergize the driving motor, and means for energizing the driving motor in a predetermined direction when no error signal exists at the end of selection, the discriminator means being operatively connected to the means for energizing the driving motor in a predetermined direction to deenergize said means when the discriminator means becomes operative.

19. A device according to claim 1, in which the remote control means comprises a network connected to the error signal to attenuate the error signal and change its phase, an amplifier receiving the output of the network and amplifying the same, a control vacuum tube coupled to and controlled by the amplifier, means for applying fixed grid bias to the control vacuum tube, a tachometer generator responsive to the speed of turning of the turret, a rectifier network operatively connected at opposed points to the tachometer generator, a grid bias feed-back connection from the rectifier network to a positive position 90° removed from the connection to the tachometer generator and operatively connected to add to the grid bias of the control vacuum tube, relay means for energizing the driving motor in a predetermined direction, a pair of opposed discriminator vacuum tubes, each having an anode, a cathode and a control grid, means for applying comparison alternating voltages respectively 180° out of phase between the anodes and cathodes of the discriminator vacuum tubes, means for connecting the control grids of the discriminator vacuum tubes to the control vacuum tubes, a differential relay having opposed coils and having contacts closing with energization in the respective opposite directions, means operatively connecting the differential relay to the driving motor for energizing the driving motor in the respective operative directions when the particular differential coil is energized and for deenergizing the driving motor when the differential coil returns to neutral position, and means for energizing the driving motor in a predetermined direction when no error signal exists at the end of selection, this last means being rendered inoperative when the differential relay is energized.

20. A device according to claim 1, in which there are indexing openings around the circumference of the turret corresponding to the turret positions, there being a plurality of turrets, indexing pins at the same relative position on each turret cooperating with the indexing openings, and means for withdrawing the indexing pins controlled at a remote point, and in which the remote control means comprises a network attenuating and changing the phase of the error signal, control vacuum tube means coupled to the input side of the amplified error signal, a tachometer generator operatively connected to the driving motor and generating an alternating current responsive to the speed of the driving motor, means for rectifying the tachometer generator voltage and applying it to the grid bias of the control vacuum tube, means for applying fixed grid bias to the control vacuum tube, a phase discriminator connected to the output of the control vacuum tube, starter coils connected to the phase discriminator, selectively energized depending upon the phase relationship of the starter coil which is energized and energizing the driving motor, the driving motor being an induction motor, braking capacitors, power connections for the stator phase coils of the induction motor, switching means, including normally open contacts connected in circuit between the power connections and the phase coils of the stator and including normally closed contacts shunting the phase coils of the stator whereby upon disconnecting the power on the stator the capacitor braking is connected, the phase discriminator releasing the starter coil when the combination of the reduced strength of the error signal and reduced sensitivity of the control vacuum tube necessitates, means responsive to the deenergization of the phase discriminator for releasing the indexing pins and means for resiliently urging the indexing pins against the circumference of the turrets when the indexing pins are released.

21. A device according to claim 1, there being walls forming the indexing openings around the circumferences of the turrets and there being a plurality of turrets, indexing pins at the same relative position on each turret cooperating with the indexing openings and controlled at remote points, in which the remote control means comprises a network attenuating and changing the phase of the error signal, a control vacuum tube coupled on the input side to the amplified error signal, a tachometer generator operatively connected to the driving motor and generating an alternating voltage responsive to the speed of the driving motor, means for rectifying the tachometer generator voltage and supplying it to the grid bias of the control vacuum tube, means for applying a fixed grid bias to the control vacuum tube, a pair of phase discriminator vacuum tubes each including an anode, a cathode and a contrtol grid, input connections from the output of the control vacuum tube to the control grids of the discriminator vacuum tubes, means for applying comparison alternating voltages of substantially identical magnitudes and 180° out of phase between the anodes and cathodes of the respective discriminator vacuum tubes, a differential relay having relay coils acting oppositely, each included in the external circuit between the anode and cathode of one of the discriminator vacuum tubes, the differential relay having contacts movable in opposite directions, a starter including starter coils operatively connected to energize the driving motor for rotation in opposite directions, operative means interconnecting the respective starter coils with the respective differential relay contacts, the differential relay being operative to start the driving motor and to cut off the energization of the driving motor under the action of the decay of the error signal and, in the case of small angular errors, of the feedback of the tachometer generator impulse, mechanism responsive to the deenergization of the differential relay for releasing the indexing pins, and resilient means for urging the indexing pins against the circumference of the turrets so that the indexing pins can engage as the turrets move toward a stop with kinetic energy sufficient for overtravel.

22. A device according to claim 1, there being a plurality of turrets, walls forming indexing openings around the circumference of the turrets, indexing pins in the same relative position on each turret cooperating with the indexing openings and means for withdrawing the indexing pins controlled at a remote point, and in which the remote control means comprises a network attenuating and changing the phase of the error signal, a vacuum tube coupling on the input side to the amplified error impulse, a tachometer generator operatively connected to the driving motor and generating an alternating voltage responsive to the speed of the driving motor, means for rectifying the tachometer generator voltage and applying it to the input of the control vacuum tube, means for applying a fixed grid bias on the control vacuum tube, a pair of discriminator vacuum tubes each including an anode, a cathode and a control grid, input connections from the output of the control vacuum tube to the control grids of the discriminator vacuum tubes, means for applying comparison alternating voltages of substantially identical magnitudes and 180° out of phase between the anodes and cathodes of the respective discriminator vacuum tubes, a differential relay having relay coils acting oppositely, each included in the external circuit between the anode and the cathode of one of the discriminator vacuum tubes, the differential relay having contacts closed by movement in opposite direction, a starter including starter coils operatively connected to energize the driving motor for rotation in opposite directions, operative means interconnecting the respective starter coils with the respective differential relay contacts, the differential relay being operative to start the driving motor and to cut off the energization of the driving motor under the action of the decay of the error signal and in the case of small angular errors of the feedback from the tachometer generator impulse, mechanism responsive to the deenergization of the differential relay for releasing the indexing pins, resilient means for urging the indexing pins against the circumferences of the turrets so that the indexing pins can engage as the turrets move toward a stop with kinetic energy sufficient for overtravel, relay means energized during selection for energizing the driving motor to drive it in a predetermined direction, means actuated by the differential relay when it is energized for rendering the relay means inoperative when the differential relay is energized, the driving motor being an induction motor, braking capacitors, switch means including normally open contacts and normally closed contacts and power connections to the stator of the driving motor, the normally open contacts of the switch means being connected between the power connections and the phase coils of the stator and the normally closed contacts of the switch means, being connected in circuit to place the braking capacitors in shunt across the phase coils of the stator.

References Cited in the file of this patent

UNITED STATES PATENTS

| | | |
|---|---|---|
| 843,746 | Hall | Feb. 12, 1907 |
| 1,090,816 | Henschel | Mar. 17, 1914 |
| 1,715,244 | McMillen | May 28, 1929 |
| 1,957,769 | Freeman | May 8, 1934 |
| 1,961,156 | McCain | June 5, 1934 |
| 2,192,520 | Levy et al. | Mar. 5, 1940 |
| 2,435,522 | Wagenknecht | Feb. 3, 1948 |
| 2,436,068 | Hegy | Feb. 17, 1948 |
| 2,515,944 | Bennett | July 18, 1950 |
| 2,572,044 | McCarthy et al. | Oct. 23, 1951 |
| 2,596,698 | Laing et al. | May 13, 1952 |